(12) United States Patent
Steele, Jr.

(10) Patent No.: US 6,622,242 B1
(45) Date of Patent: Sep. 16, 2003

(54) SYSTEM AND METHOD FOR PERFORMING GENERALIZED OPERATIONS IN CONNECTION WITH BITS UNITS OF A DATA WORD

(75) Inventor: Guy L. Steele, Jr., Lexington, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/545,018

(22) Filed: Apr. 7, 2000

(51) Int. Cl.[7] ............................. G06F 7/00; G06F 9/00
(52) U.S. Cl. ....................... 712/300; 712/221; 708/209
(58) Field of Search ................................ 712/300, 223, 712/224, 225, 226, 204, 221, 222; 708/200, 209, 400, 303, 505; 711/109

(56) References Cited

U.S. PATENT DOCUMENTS

| | | | |
|---|---|---|---|
| 4,583,197 A | | 4/1986 | Chappell et al. |
| 4,583,199 A | * | 4/1986 | Boothroyd et al. ......... 712/300 |
| 4,984,189 A | | 1/1991 | Neki |
| RE33,664 E | * | 8/1991 | Kang et al. .............. 711/109 X |
| 5,487,159 A | * | 1/1996 | Byers et al. ................. 712/223 |
| 5,696,922 A | * | 12/1997 | Fromm ........................ 708/209 |
| 6,098,087 A | * | 8/2000 | Lemay ........................... 711/5 |

OTHER PUBLICATIONS

Knuth, Donald E. The Art of Computer Programming, 2d. Ed., vol. 3, p. 237, problem 13. Reading, MA: AddisonWesley, 1998.

* cited by examiner

*Primary Examiner*—Henry W. H. Tsai
(74) *Attorney, Agent, or Firm*—Cesari and McKenna, LLP

(57) ABSTRACT

A functional unit is described for selectively performing a number of types of bit rearrangement operations, including a generalized bit reverse operation and a generalized shuffle/unshuffle operation, and in addition left and right unsigned shift operations and an arithmetic shift right operation. The functional unit includes a shifter array and a control signal generator. The shifter array includes a plurality of selector circuits arrayed in a number of stages for shifting bits of an input data word in accordance with control signals, the output of the last stage corresponding to a rearranged output data word. The control signal generator generates control signals in response to rearrangement operation type and pattern information.

38 Claims, 10 Drawing Sheets

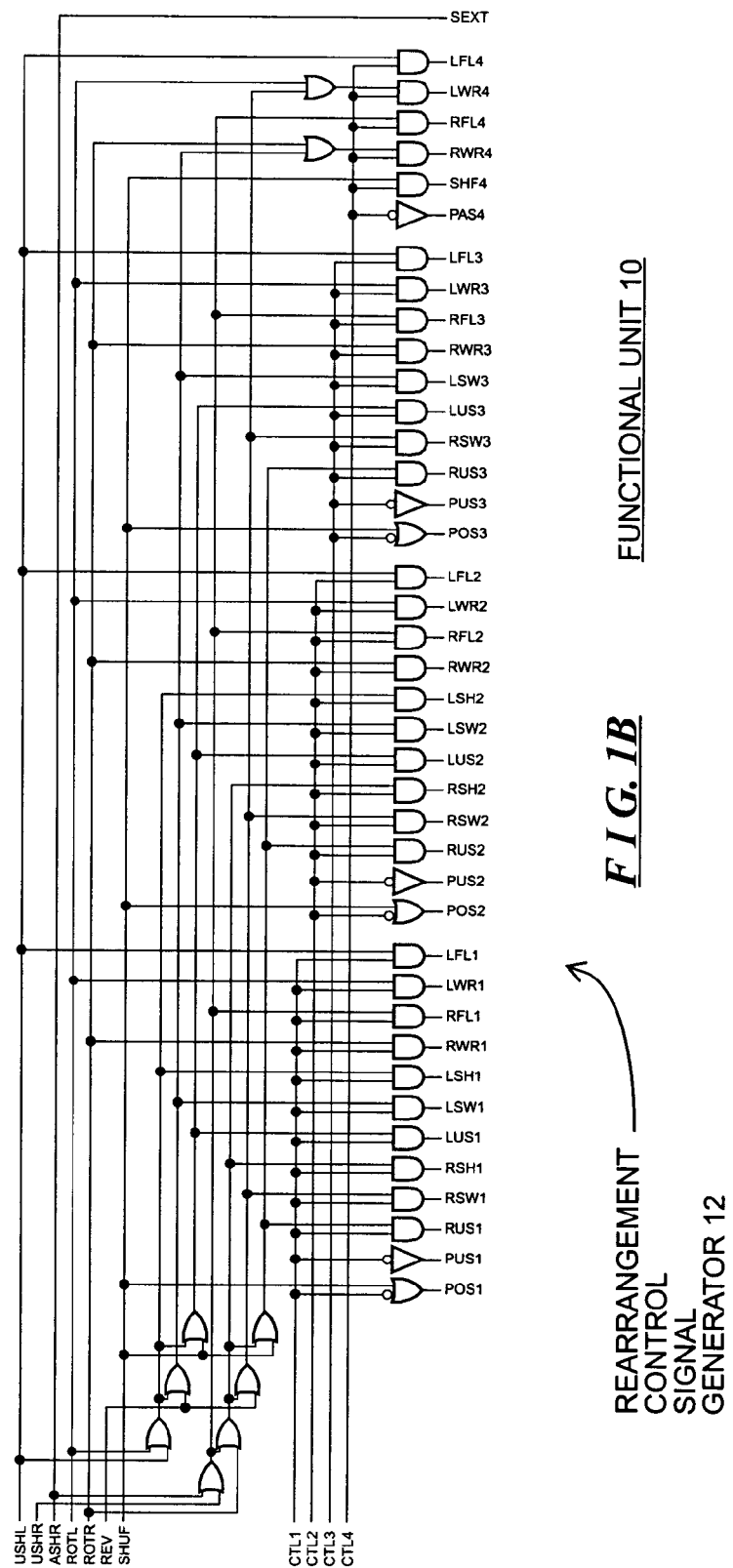

SYSTEM AND METHOD FOR PERFORMING GENERALIZED OPERATIONS IN CONNECTION WITH BITS UNITS OF A DATA WORD

FIELD OF THE INVENTION

The invention relates generally to the field of digital computers and more specifically to functional units for processing predetermined types of instructions. The invention particularly provides a circuit or functional unit for use in connection with execution of various types of instructions for rearranging bits of a data word.

BACKGROUND OF THE INVENTION

Computers process data in accordance with instructions. A number of types of instructions rearrange bits of data words in predetermined patterns by, for example, shifting them, rotating them and the like. Typically, such instructions have two operands, with one operand comprising the data word and the other operand providing control information indicating in part how the bits of the data word are to be rearranged. In some cases, all of the bits of the data word are used in the rearranged data word. In other cases, some or all of the bits of the data word are discarded and replaced with bits having predetermined values, such as "zero" or "one."

Typical examples of such instructions are "unsigned shift left," "unsigned shift right," "arithmetic shift right," "rotate left," and "rotate right." If the operand data word consists of "N" bits D0 D1 D2 . . . DN−1 (generally Dn) and "m" is a control operand having a value $0 \leq m < N$, an unsigned shift left instruction results in a shift of the bits of the operand data word to the left by "m" places, with the bits in the "m" bit positions at the right end of the rearranged data word being provided with bits having the value "zero." That is, the rearranged data word would be Dm Dm+1 . . . DN−1 0 . . . 0, where the "m" bit positions at the right are provided with bits having the value "zero," and the bits D0 . . . Dm−1 of the operand data word are "shifted out" of the left end of the rearranged data word. Essentially, the bit in bit position "k" of the rearranged data word receives the bit in bit position k+m of the operand data word for k+m<N, and otherwise the bit in the rearranged data word receives the value "zero." Similarly, an unsigned shift right instruction results in a shift of the bits of the operand data word to the right by "m" places, with the bits in the "m" bit positions at the left end of the rearranged data word being provided with bits having the value "zero." That is, the rearranged data word would be 0 . . . 0 D0 D1 . . . DN−1−m, where the "m" bit positions to the left are provided with bits having the value "zero" and the bits DN−m . . . DN−1 of the operand data word are "shifted out" of the right end of rearranged data word. Essentially, the bit in bit position "k" of the rearranged data word receives the bit in bit position k−m of the operand data word, for k−m≥0, and otherwise the bit in the rearranged data word receives the value "zero." It will be appreciated that, if "m" has the value "zero," the rearranged data word is the same as the input data word for both types of instructions.

An arithmetic shift right instruction provides a result similar to the unsigned shift right, except that, instead of providing the "m" bit positions at the left end of the rearranged data word with the value "zero," they are provided with bits having the value in bit position D0 of the operand data word. That is, the rearranged data word is D0 . . . D0 D0 D1 . . . DN−1−m, where there are "m" bits D0 . . . D0 to the left of bits D0 D1 . . . DN−1−m. The arithmetic shift right instruction is typically used with an operand data word which is a signed number, with the D0 data bit comprising the sign, that is, indicating whether the number is positive or negative, and the remaining bits D1 . . . DN−1 indicating the absolute value of the number. The arithmetic shift right instruction results in the bits D1 . . . DN−1 comprising the absolute value being shifted to the right by "m" bit positions, with the bits DN−m . . . DN−1 being shifted out of the rearranged data word, and the sign bit D0 being extended through the first m+1 bit positions of the rearranged data word.

The rotate left and rotate right instructions are also similar to the unsighted shift left and unsigned shift right instructions, except that, instead of providing bits having the value "zero" in the "in" bit positions of the left and right end of the rearranged data word, respectively, the bits that are "shifted out" of the right and left ends respectively are "shifted into" those "m" bit positions. That is, the rearranged data word provided in response to the rotate left and rotate right instructions would be Dm Dm+1 . . . DN−1 D0 . . . Dm−1 and DN−m . . . DN−1 D0 D1 . . . DN−1−m, respectively. Essentially, for a rotate left instruction, the bit in bit position "k" of the rearranged data word receives the value of the bit in bit position k+m of the operand data word for k+m<N, and otherwise bit "k" of the rearranged data word receives the bit in bit position k+m−N of the operand data word. Similarly, for a rotate right instruction, the bit in bit position "k" of the rearranged data word receives the bit in bit position k−m of the operand data word for k−m>0, and otherwise bit "k" of the rearranged data word receives the bit in bit position k−m+N of the operand data word.

Several other types of bit manipulation instructions have also been proposed, such as, for example, a generalized bit reverse instruction and a generalized shuffle/unshuffle instruction. For a generalized bit reverse instruction bit "k" in the rearranged data word receives the bit in bit position k XOR m of the operand data word. For example, if "m" equals "one," the rearranged data word is D1 D0 D3 D2 D5 D4 . . . DN−1 DN−2, with successive pairs of bits in bit positions Dn Dn+1 of the operand data word being reversed Dn+1 Dn in the rearranged data word. On the other hand, if "m" equals "two," the rearranged data word is D2 D3 D0 D1 D6 D7 D4 D5 . . . DN−2 DN−1 DN−4 D−3, with successive pairs of pairs of bits in bit positions Dn Dn+1 Dn+2 Dn+3 of the operand data word being reversed Dn+2 Dn+3 Dn Dn+1 in the rearranged data word. Generally, if "m" is equal to "p−q," where "p" and "q" are both powers of two, the generalized bit reverse instruction results in a division of the operand data word into sections of size "p" and each section being divided into chunks of size "q", with the sections in the rearranged data word being in the same order as in the operand data word, but the chunks in each section being in reversed order in the rearranged data word. This is illustrated in the above examples, since for m=1=2−1 ($=2^1-2^0$), the size of each section was two and the size of each chunk was one, and successive pairs of bits in bit positions Dn Dn+1 of the operand data word were reversed Dn+1 Dn in the rearranged data word. Similarly, for m=2=4−2 ($=2^2-2^1$), the size of each section was four and the size of each chunk was two, and successive pairs of pairs of bits in bit positions Dn Dn+1 Dn+2 Dn+3 of the operand data word were reversed Dn+2 Dn+3 Dn Dn+1 in the rearranged data word. If, for example, m=7=8−1 ($=2^3-2^0$), the generalized bit reverse instruction results in a rearranged data word in which the bit positions of the bits in each of the operand data word are in reversed order. On the other hand, if m=N−8 ($=2^{LogN}-2^3$) (where, it will be assumed, $Log_2N$ is an integer), the generalized bit reverse instruction results in a rearranged data word in which the order of bytes in the operand data word is reversed in the rearranged data word. If m=0, the rearranged data word corresponds to the operand data word.

The operation enabled by a generalized shuffle/unshuffle instruction is somewhat more complex. To "shuffle" "N" items, such as bits of an operand data word, is to rearrange them so that the "n-th" item of the rearranged data word corresponds to item (2*(n mod (N/2))+((2n/N) mod 2) of the operand data word. The inverse is the "unshuffle" operation, in which item "n" of the rearranged data word corresponds to item ((n−(n mod 2))/2)+((n mod 2)*(N/2)).

SUMMARY OF THE INVENTION

The invention provides a new and improved system, comprising a circuit or functional unit for use in connection with execution of various types of instructions for rearranging bits of a data word. The functional selectively performs a number of types of bit rearrangement operations, including a generalized bit reverse operation and a generalized shuffle/ unshuffle operation, and in addition can left and right unsigned shift operations and an arithmetic shift right operation. The functional unit includes a shifter array and a control signal generator. The shifter array includes a plurality of selector circuits arrayed in a number of stages for shifting bits of an input data word in accordance with control signals, the output of the last stage corresponding to a rearranged output data word. The control signal generator generates control signals in response to rearrangement operation type and pattern information.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 1A and 1B together depict a functional block diagram of a circuit or functional unit for use in connection with execution of various types of instruction for rearranging of a data word;

DETAILED DESCRIPTION OF AN ILLUSTRATIVE EMBODIMENT

Figure 1A:
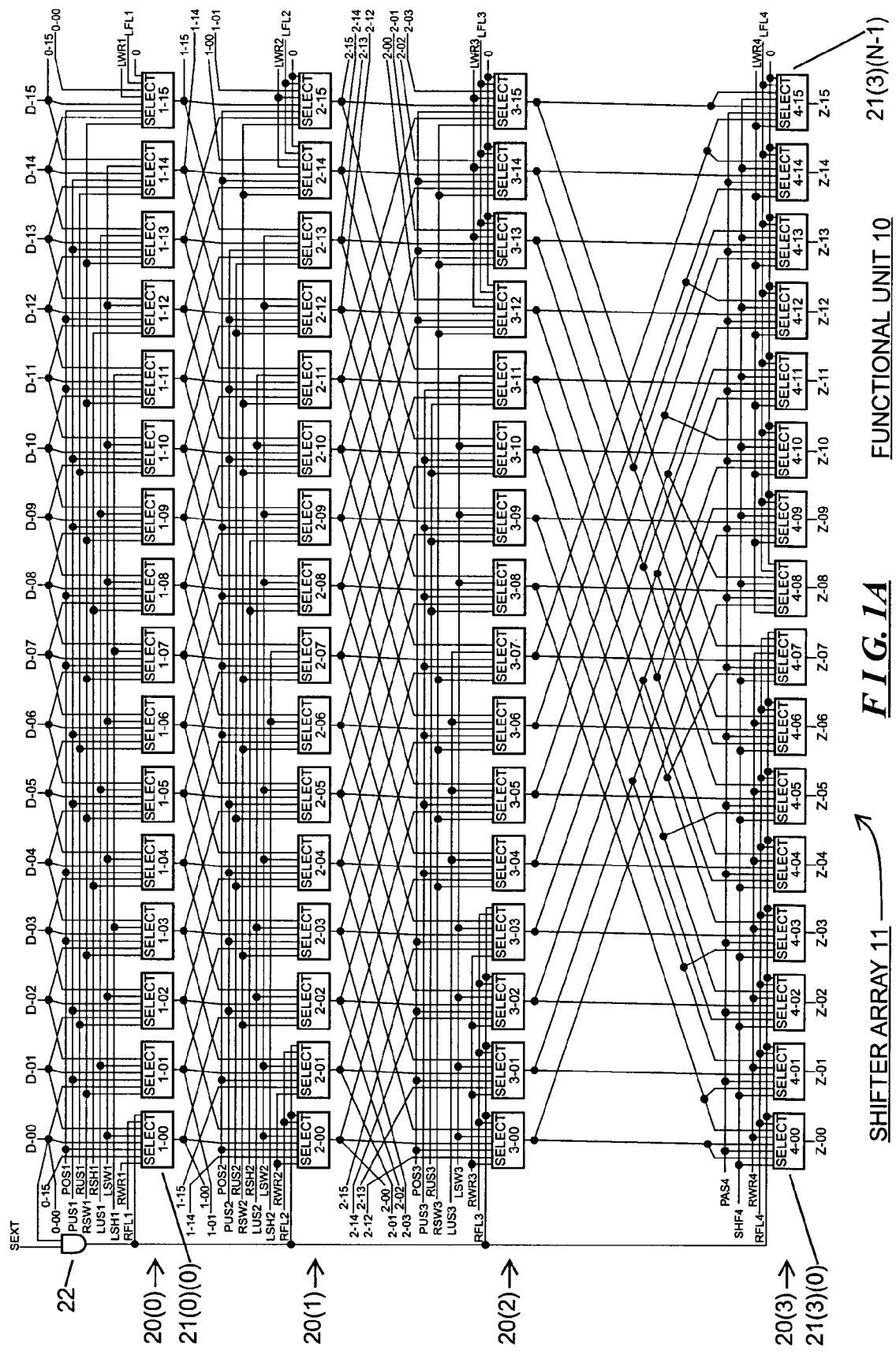

FIGS. 1A and 1B together depict a functional block diagram of a circuit or functional unit 10 for use in connection with execution of various types of instructions for rearranging bits of a data word. The functional unit 10 comprises a shifter array 11, which is depicted on FIG. 1A, which receives an N-bit operand data word comprising bits in bit positions D0 through DN−1 (generally identified by reference numeral Dn) and rearranges the bits in accordance with rearrangement control signals provided by a rearrangement control signal generator 12 depicted on FIG. 1B, to provide an N-bit rearranged data word comprising bits in bit positions Z0 through ZN−1 (generally identified by reference numeral Zn). The rearrangement control signal generator 12 generates the rearrangement control signals in response to a plurality of operation type identification signals, which identify the type of rearrangement that is to be performed, and a plurality of rearrangement extent control signals which effectively encode a value which identifies the extent of the rearrangement that is to be performed. If the functional unit 10 is used in connection with execution of a computer instruction, the operation type identification signals may be provided, for example, to identify the type of instruction to be executed, and the rearrangement extent control signals may be provided in response to the value of one operand of the particular instruction to be executed; it will be appreciated that the operand data word may also be one of the operands of the particular instruction to be executed.

With reference to FIG. 1A, the shifter array 11 comprises a plurality of selector circuits arrayed in a series of shift stages 20(0) through 20(S−1) (generally identified by reference numeral 20(s)), where $S=Log_2N$, with each shift stage 20(s) including "N" selector circuits 21(s)(0) through 21(s)(N−1) (generally identified by reference numeral 21(s)(n)). In the embodiment depicted in FIGS. 1A and 1B, "N" is selected to be sixteen, but it will be appreciated that "N" may have any value which, preferably will be a power of two. Each selector circuit 21(s)(n) includes a plurality of pairs of inputs, with each input pair receiving one input data signal and one rearrangement control signal, and couples in response an output data signal. The input data signals provided to the selector circuits 21(0)(n) in the first shift stage 20(0) are representative of the values of the bits in bit positions Dn of the operand data word, and the input data signals provided to the selector circuits 21(1)(n) through 21(S−1)(n) of the other stages are representative of the data bits as rearranged in the respective previous shift stage 21(0)(n) through 21(S−2)(n). At any point in time, at most one rearrangement control signal as received by a selector circuit 21(s)(n) will be asserted, and so the output data signal coupled by a selector circuit will be representative of the input data signal in the input pair for which the respective rearrangement control signal is asserted. Illustrative circuits for selector circuits 21(n)(s) will be described below in connection with FIGS. 2A and 2B.

Each selector circuit 21(0)(n) through 21(S−2)(n) in the first S−1 shift stages 20(0) through 20(S−2) receives three input data signals. In the first shift stage 20(0), the selector circuits 21(0)(n) receive input data signals representative of data bits in bit positions Dn, Dn−1 (mod N), and Dn+1 (mod N) (where "mod N" represents the "modulo N" function). Thus, selector circuit 21(0)(0) receives, in addition to an input data signal representative of data bit in bit position D0, input data signals representative of data bit in bit position DN−1 (which corresponds to Dn−1 (mod N)) and of data bit in bit position D1 from the operand data word. Similarly, selector circuit 21(0)(N−1) receives, in addition to an input data signal representative of data bit in bit position DN−1, input data signals representative of data bit in bit position DN−2 and of data bit in bit position D0 (which corresponds to Dn+1 (mod N)). Similarly, in the second shift stage 20(1), each selector circuit 21(1)(n) receives input data signals representative of the output signals provided by the correspondingly-indexed selector circuit 21(0)(n), as well as selector circuits 21(0)(n−2) (mod N) and 21(n+2) (mod N). Generally, each selector circuit 21(s)(n) in the first S−1 stages 20(0) through 20(S−2) receives input data signals from the preceding shift stage or, in the case of the first shift stage 20(0), from the operand data word, from the correspondingly-indexed column "n," and from the columns n−$2^s$ (mod N) and n+$2^s$ (mod N) to the left (mod N) and right (mod N) of column "n," respectively. Generally, the first data input for each selector circuit 21(s)(n) in the first S−1 stages will receive the signal from the column to the left (mod N), the second data input will receive the signal from the correspondingly-indexed column, and the third data input will receive the signal from the column to the right (mod N).

The selector circuits 21(S−1)(n) in the last shift stage 20(S−1) are connected to receive signals from the selector circuits in shift stage 20(S−2) somewhat differently. Generally, each selector circuit 21(S−1)(n) also receives an input data signal from the selector circuit 21(S−2)(n) in the correspondingly-indexed column "n" as their second data inputs. However, for selector circuits 21(S−1)(0) through 21(S−1)(N/2−1) in the left N/2 columns "0" through (N/2)−1, the third data inputs are provided by selector circuits 21(S−2)(N/2) through 21(S−2)(N−1), respectively, in the preceding shift stage 20(S−2). Similarly, for selector circuits 21(S−1)(N/2) through 21(S−1)(N−1) in the left N/2 columns N/2 through N−1, the first data inputs are provided by selector circuits 21(S−2)(0) through 21(S−2)(N/2−1), respectively. It will be appreciated that this essentially corresponds to the same interconnection pattern as the previous stages.

However, the first data inputs of the selector circuits 21(S−1)(0) through 21(S−1)(N/2−1) and the third data inputs of selector circuits 21(S−1)(N/2) through 21(S−1)(N−1) are connected differently. For the selector circuits 21(S−1)(0) through 21(S−1)(N/2−1) in the left columns "0" through (N/2)−1, the selector circuits with even-indexed columns (including column "0") receive as their first data inputs the outputs of the respective left N/4 selector circuits 21(S−2)(0) through 21(S−2)(N/4−1), respectively. Thus, the first data input of selector circuit 21(S−1)(0) receives the output of selector circuit 21(S−2)(0), the first data input of selector circuit 21(S−1)(2) receives the output of selector circuit 21(S−2)(1), the first data input of selector circuit 21(S−1)(4) receives the output of selector circuit 21(S−2)(2), and so forth. For the selector circuits 21(S−1)(0) through 21(S−1)(N/2−1) in the left columns "0" through (N/2)−1, the selector circuits with odd-indexed columns receive as their first data inputs the outputs of the respective N/4 selector circuits 21(S−2)(N/2) through 21(S−2)(3N/4−1), respectively. Thus, the first data input of selector circuit 21(S−1)(1) receives the output of selector circuit 21(S−2)(N/2), the first data input of selector circuit 21(S−1)(3) receives the output of selector circuit 21(S−2)(N/2+1), the first data input of selector circuit 21(S−1)(5) receives the output of selector circuit 21(S−2)(N/2+2), and so forth.

Similarly, for the selector circuits 21(S−1)(N/2) through 21(S−1)(N−1) in the right columns "N/2" through "N−1," the selector circuits with odd-indexed columns receive as their third data inputs the outputs of the respective right N/4 selector circuits 21(S−2)(3N/4−1) through 21(S−2)(N−1), respectively. Thus, the third data input of selector circuit 21(S−1)(N−1) receives the output of selector circuit 21(S−2)(N−1), the third data input of selector circuit 21(S−1)(N−3) receives the output of selector circuit 21(S−2)(N−2), the third data input of selector circuit 21(S−1)(N−5) receives the output of selector circuit 21(S−2)(N−3), and so forth. For the selector circuits 21(S−1)(N/2) through 21(S−1)(N−1) in the left columns "N/2" through "N−1," the selector circuits with even-indexed columns receive as their third data inputs the outputs of the respective N/4 selector circuits 21(S−2)(N/4) through 21(S−2)(N/2−1), respectively. Thus, the third data input of selector circuit 21(S−1)(N−2) receives the output of selector circuit 21(S−2)(N/2−1), the third data input of selector circuit 21(S−1)(N−4) receives the output of selector circuit 21(S−2)(N/2−3), the third data input of selector circuit 21(S−1)(N−4) receives the output of selector circuit 21(S−2)(N/2−4), and so forth.

Essentially, if the selector circuits 21(S−1)(0) through 21(S−1)(N/2−1) in the left columns "0" through "N/2−1" are enabled to couple the signals at their first inputs to their respective outputs, and the selector circuits 21(S−1)(N/2) through 21(S−1)(N−1) are contemporaneously enabled to couple the signals at their third inputs to their respective outputs, the result is an interleaving of the signals provided by the selector circuits 21(S−2)(0) through 21(S−2)(N/2−1) in the left columns "0" through "N/2−1" and the selector circuits 21(S−2)(N/2) through 21(S−2)(N−1) in the right columns "N/2" through "N−1" of the preceding stage. This occurs because the successive selector circuits 21(S−1)(n) for "n" an even number will be enabled to couple the signals from the successive selector circuits 21(S−2)(0) through 21(S−2)(N/2−1) (that is, the selectors in the left columns "0" through "N/2−1)) in the preceding shift stage 20(S−2) to their respective outputs, and the successive selector circuits 21(S−1)(n) for "n" an odd number will be enabled to couple the signals from the successive selector circuits 21(S−2)(N/2) through 21(S−2)(N−1) (that is, the selectors in the right columns "N/2" through "N−1") in the preceding shift stage 20(S−2) to their respective outputs.

In addition to the data signal inputs as described above, some of the selector circuits 21(s)(n) also have respective fourth data signal inputs. These data signal inputs are provided to facilitate the shifting in of selected values during, for example, unsigned shift left and right operations and to facilitate the sign extension during an arithmetic shift right operation. Thus, in each shift stage 20(s), the right most $2^s$ selector circuits 21(s)(N−$2^s$) through 21(s)(N−1) includes a fourth data input which is provided with a signal representing the value "zero." In addition, in each shift stage 20(s), the left most $2^s$ selector circuits 21(s)(0) through 21(s)($2^s$−1) includes a fourth data input which is provided with a value corresponding to the logical AND of a sign extension signal SEXT and a signal representative of the D0 bit of the operand data word. As will be described below, the SEXT sign extension signal is generated by the rearrangement control signal generator 12 and is asserted if the operation to be performed is an arithmetic shift right operation. Thus, if the SEXT sign extension signal is negated, which will be the case if the arithmetic shift right operation is not to be performed, a signal representing the value "zero" will be provided to the fourth data inputs of the leftmost $2^s$ selector circuits 21(s)(0) through 21(s)($2^s$−1) in each shift stage 20(s). On the other hand, if the SEXT sign extension signal is asserted, which will be the case if the arithmetic shift left operation is to he performed, a signal representing the condition of the D0 data bit of the operand data word will be provided to the fourth data inputs of the leftmost $2^s$ selector circuits 21(s)(0) through 21(s)($2^s$−1) in each shift stage 20(s). The shifter array 11 includes an AND gate 22 to provide a signal representative of the logical AND of the SEXT sign extension signal and the signal representative of the D0 bit of the operand data word to the appropriate selectors.

The rearrangement control signal generator 12 generates a number of control signals for controlling the coupling of the data signals by the selector circuits 21(s)(n). A logic diagram of the rearrangement control signal generator 12 used in one embodiment is depicted in FIG. 1B. Generally, the rearrangement control signal generator 12 receives seven rearrangement type control signals, indicating the type of rearrangement operation that is to be performed, and $Log_2N$ rearrangement extent control signals, which identify the extent of the rearrangement that is to be performed. The rearrangement control signals include USHL unsigned shift left, USHR unsigned shift right, ASHR arithmetic shift right, ROTL rotate left, ROTR rotate right, REV reverse and SHUF shuffle signals. At most one of these signals will be asserted for any rearrangement operation. The rearrangement extent control signals, identified as CTL1 through CTL4 signals on FIG. 1B, encodes a value "m" as $m=2^0*CTL1+2^1*CTL2+ \ldots +2^{(Log_2N)-1}*CTL(Log_2N)$, where $Log_2N=4$ for N=16. Generally, the value "m" will be provided as one operand of the instruction processed by the functional unit 10. In addition to the SEXT sign extension signal described above, the rearrangement control signal generator 12 generates $Log_2N$ sets of control signals, with each set controlling selector circuits 21(s)(n) in the respective shift stage 20(s). The rearrangement control signal generator 12 generates the rearrangement control signals as follows:

POSj [Pass OutSide bits]=SHUF or not CTLj
PUSj [Pass UnShuffle bits]=not CTLj
RUSj [Right UnShuffle]=CTLj and (USHR or ASHR or ROTR or SHUF)
RSWj [Right SWap]=CTLj and (USHR or ASHR or ROTR or REV)
RSHj [Right SHift]=CTLj and (USHR or ASHR or ROTR)
RWRj [Right WRap]=CTLj and ROTR
RFLj [Right FiL1]=CTLj and (USHR or ASHR)
LUSj [Left UnShuffle]=CTLj and (USHL or ROTL or SHUF)
LSWj [Left SWap]=CTLj and (USHL or ROTL or REV)
LSHj [Left SHift]=CTLj and (USHL or ROTL)
LWRj [Left WRap]=CTLj and ROTL
LFLj [Left FiL1]=CTLj and USHL for "j" ranging from 1 to $(Log_2N)-1$. The above-described rearrangement control signals are used in shift stages 20(0) through 20(S–2), and are applied to control shift stages 20(j–1), respectively. For "j" equal to $Log_2N$ (which will hereinafter be referenced by "v"), the rearrangement control signal generator 12 generates rearrangement control signals, which are applied to control shift stage 20(S–1), as follows:

PASv [PASs]=not CTLv
SHFv [SHuFfle]=CTLv and SHUF
RWRv [Right WRap]=CTLv and (ROTR or USHL or ROTL or REV)
RFLv [Right FiL1]=CTLv and (USHR or ASHR)
LWRv [Left WRap]=CTLv and (ROTL or USHR or ASHR or ROTR or REV)
LFLv [Left FiL1]=CTLv and USHL In addition, the rearrangement control signal generator 12 generates the SEXT sign extension signal as follows:

SEXT [Sign EXTension]=ASHR

Returning to FIG. 1A, these control signals are applied to the respective selector circuits 21(n)(s) as follows. Generally, if a selector circuit 21(s)(n) is associated with a value "R" generated as $GI[n/2^s]$ AND 3 (where "GI" represents the "greatest integer" in the argument; that is, the value "R" corresponds to the value generated by shifting the binary representation of "n" to the left by "s" bit positions, and taking the two low-order two bits), for the shift stages 20(0) through 20(S–2):

(i) the rearrangement control signal for the first input (that is, the input that receives the signal from $2^s$ columns to the left (mod N) is:
  (a) for $0 \leq n < 2^s$, RWRj (right wrap);
  (b) otherwise (that is, for $2^s \leq n < N$),
    (I) if "R" is zero, RSHj (right shift);
    (II) if "R" is one or three, RSWj (right swap); and
    (III) if "R" is two, RUSj (right unshuffle);

(ii) the rearrangement control signal for the second input (that is, the input that receives the signal from the correspondingly-indexed column) is:
  (a) if "R" is zero or three, POSj (pass outside bits); and
  (b) if "R" is one or two, PUSj (pass unshuffle bits);

(iii) the rearrangement control signal for the third input, that is, the input that receives the signal from $2^s$ columns to the right (mod N) is:
  (a) for $N-2^s \leq n < N$, LWRj (left wrap);
  (b) otherwise (that is, for $0 \leq n < N-2^s$),
    (I) if "R" is zero or two, LSWj (left swap);
    (II) if "R" is one, LUSj (left unshuffle); and
    (III) if "R" is three, LSHj (left shift).

If the selector circuit 21(n)(s) has a fourth input, the rearrangement control signal therefor is RFLj (right fill) for n<N/2 and otherwise LFLj (left fill).

For the selector circuits 21(S–1)(n) in the last stage 20(S–1), the control signals are applied as follows:

(i) the rearrangement control signal for the first input is:
  (a) for $0 \leq n < N/2$, SHFv (shuffle);
  (b) otherwise (for $N/2 \leq n < N$), LWRv (left wrap);
(ii) the rearrangement control signal for the second input is PASv (pass);
(iii) the rearrangement control signal for the third input is:
  (a) for $0 \leq n < N/2$, RWRv (right wrap); and
  (b) otherwise (for $N/2 \leq n < N$), SHFv (shuffle);

If a selector circuit 21(s)(n) has a fourth input, the rearrangement-control signal therefor is RFLv (right fill) for n<N/2 and otherwise LFLv (left fill).

Thus, for (i) the USHL (unsigned shift left) operation,
  (a) control signals LUSj (left unshuffle), LSWj (left swap), LSHj (left shift) and LFLj (left fill) are asserted for those shift stages 20(0) through 20(S–2) for which control signals CTL1 through CTL $((Log_2N)-1)$ are asserted, to enable the selector circuits 21(0)(0) through 21(0)(N–2), 21(1)(0) through 21(1)(N–3), . . . , 21(S–2)(0) through 21(S–2)(N–1–$2^s$) to couple the signals at their respective third inputs to their respective outputs thereby to enable them to shift data bits to the left, and to enable the selector circuits 21(s)(N–$2^s$) through 21(s)(N–1) to couple signals at their respective fourth inputs to their respective outputs having the value "zero,"
  (b) control signals LFLv (left fill) and RWRv (right wrap) will be asserted for shift stage 20(S–1) if signal $CTL(Log_2N)$ is asserted, to enable the selector circuits 21(S–1)(0) through 21(S–1)(N/2–1) in the last stage 20(S−1) to couple the signals at their respective third inputs to their respective outputs, thereby to shift the signals from the right N/2 selector circuits 21(S−2)(N/2) through 21(S−2)(N−1) to the left, and to enable the selector circuits 21(S−1) (N/2) through 21(S−1)(N−1) to couple signals at their fourth inputs to their respective outputs having the value "zero," and (c) control signals POSj (pass outside bits) and PUSj (pass unshuffle bits) will be 14 asserted for those shift stages 20(0) through 20(S−2) for which control signals CTL1 through CTL((Log$_2$N)−1) are negated and, if the signal CTL(Log$_2$N) is negated, the control signal PASv will be asserted, to enable the respective selectors to couple signals at their second inputs to their outputs thereby to enable them to maintain data bits in the same column "n";

(ii) the USHR (unsigned shift right) and (iii) ASHR (arithmetic shift right) operations, (a) control signals RUSj (right unshuffle), RSWj (right swap), RSHj (right shift) and RFLj (right fill) are asserted for those shift stages 20(0) through 20(S−2) for which control signals CTL1 through CTL ((Log$_2$N)−1) are asserted, to enable the selector circuits 21(0)(1) through 21(0)(N−1), 21(1)(2) through 2l(1)(N−1), . . . , 21(S−2)(2$^{S-2}$) through 21(S−2)(N−1) to couple the signals at their respective first inputs to their respective outputs thereby to enable them to shift data bits to the right, and to enable the selector circuits 21(s)(0) through 21(s) (2$^s$−1) to couple signals at their respective fourth inputs to their respective outputs having the value corresponding to the logical AND of the SEXT sign extension signal and the signal representative of operand data bit in bit position D0, (b) control signals LWRv (left wrap) and RFL (right fill) will be asserted for shift stage 20(S−1) if signal CTL(Log$_2$N) is asserted, thereby to shift the signals from the left N/2 selector circuits 21(S−2)(0) through 21(S−2)(N/2−1) to the right, and to enable the selector circuits 21(S−1)(0) through 21(S−1)(N/2−1) to couple signals at their respective fourth inputs to their respective outputs having the value corresponding to the logical AND of the SEXT sign extension signal and the signal representative of operand data bit in bit position D0, and (c) control signals POSj (pass outside bits) and PUSj (pass unshuffle bits) will be asserted for those shift stages 20(0) through 20(S−2) for which control signals CTL1 through CTL((Log$_2$N)−1) are negated and, if the signal CTL(Log$_2$N) is negated, the control signal PASv will be asserted, to enable the respective selectors to couple signals at their second inputs to their outputs thereby to enable them to maintain data bits in the same column "n";

(iv) the ROTL (rotate left) operation, (a) control signals LUSj (left unshuffle), LSWj (left swap), LSHj (left shift) and LWRj (left wrap) are asserted for those shift stages 20(0) through 20(S−2) for which control signals CTL1 through CTL ((Log$_2$N)−1) are asserted, to enable the selector circuits 21(0)(n) through 21(S−2)(N−1) to couple the signals at their respective third inputs to their respective outputs thereby to enable them to shift data bits to the left (mod N), (b) control signals LWRv (left wrap) and RWRv (right wrap) will be asserted for shift stage 20(S−1) if signal CTL(Log$_2$N) is asserted, to enable the selector circuits 21(S−1)(0) through 21.(S−1)(N−1) to couple the signals at their respective third inputs to their respective outputs thereby to enable them to shift data bits to the left (mod N), and (c) control signals POSj (pass outside bits) and PUSj (pass unshuffle bits) will be asserted for those shift stages 20(0) through 20(S−2) for which control signals CTL1 through CTL((Log$_2$N)−1) are negated and, if the signal CTL(Log$_2$N) is negated, the control signal PASv will be asserted to enable the respective selectors to couple signals at their second inputs to their outputs thereby to enable them to maintain data bits in the same column "n";

(v) the ROTR (rotate right) operation, (a) control signals RUSj (right unshuffle), RSWj (right swap), RSHj (right shift) and RWRj (right wrap) are asserted for those shift stages 20(0) through 20(S−2) for which control signals CTL1 through CTL ((Log$_2$N)−1) are asserted, to enable the selector circuits 21(0)(n) through 21(S−2)(N−1) to couple the signals at their respective first inputs to their respective outputs thereby to enable them to shift data bits to the right (mod N)

(b) control signals LWRv (left wrap) and RWRv (right wrap) will be asserted for shift stage 20(S−1) if signal CTL(Log$_2$N) is asserted, to enable the selector circuits 21(S−1)(0) through 21(S−1)(N−1) to couple the signals at their respective third inputs to their respective outputs thereby to enable them to shift data bits to the right (mod N), and (c) control signals POSj (pass outside bits) and PUSj (pass unshuffle bits) will be asserted for those shift stages 20(0) through 20(S−2) for which control signals CTL1 through CTL((Log$_2$N)−1) are negated and, if the signal CTL(Log$_2$N) is negated, the control signal PASv will be asserted to enable the respective selectors to couple signals at their second inputs to their outputs thereby to enable them to maintain data bits in the same column "n";

(vi) the REV operation (a) control signals LSWj (left swap) and RSWj (right swap) are asserted for those shift stages 20(0) through 20(S−2) for which control signals CTL1 through CTL((Log$_2$N)−1) are asserted, to enable, within each group of $2^{s+1}$ selectors in each shift stage 20(s), the left "$2^s$" selectors in each group to couple signals at their respective third inputs to their respective outputs, and the right "$2^s$" selectors in each group to couple signals at their respective first inputs to their respective outputs, thereby to swap the left and right signals in each group of $2^{s+1}$ selectors;

(b) control signals LWRv (left wrap RWRv (right wrap) will be asserted for shift stage 20(S−1) if signal CTL (Log$_2$N) is asserted, to enable the left N/2 selectors to couple signals at their respective third inputs to their respective outputs, and the right N/2 selectors to couple signals at their respective first inputs to their respective outputs, thereby to swap the left and right signals, and (c) control signals POSj (pass outside bits) and PUSj (pass unshuffle bits) will be asserted for those shift stages 20(0) through 20(S−2) for which control signals CTL1 through CTL((Log$_2$N)−1) are negated and, if the signal CTL(Log$_2$N) is negated, the control signal PASv will be asserted to enable the respective selectors to couple signals at their second inputs to their outputs thereby to enable them to maintain data bits in the same column "n"; and (vii) the SHUF (shuffle/unshuffle) operation,
 (a) control signals POSj (pass outside bits) will be asserted for shift stages 20(0) through 20(S−2) to enable the left and right selector circuits 21(0)(0), 21(0)(3), 21(0)(4), 21(0)(7), . . . in the each nibble (that is, four consecutive selectors) in shift stage 20(0), the two left and right selector circuits 21(1)(0), 21(1)(1), 21(1)(6), 21(1)(7), . . . in each byte (that is, eight consecutive selectors) in shift stage 20(1); the four left and right selector circuits 21(2)(0) through 21(2)(3), 21(2)(12) through 21(2)(15), . . . in each word (that is, sixteen consecutive selectors) in shift stage 20(2) (generally, the left and right $2^s$ selectors in each group of $2^{s+2}$ selectors in each shift stage 20(s), s=0, . . . ,S−2) to couple the signal at their respective second inputs to their respective outputs, thereby to enable them to maintain data bits in the same column "n";
 (b) control signals LUSj (left unshuffle) and RUSj (right unshuffle) are asserted for those shift stages 20(0) through 20(S−2) for which, control signals CTL1 through CTL((Log$_2$N)−1) are asserted to enable, for the middle $2^{s+1}$ selectors in each group of $2^{s+2}$ selectors in each shift stage 20(s) (s=0, . . . ,S−2), the left $2^s$ selectors to couple the signal at their respective third input to their respective output, and the right $2^s$ selectors to couple the signal at their respective first input to their respective output, thereby to effect a swap of the signals as between those selectors,
 (c) control signal SHFv (shuffle) will be asserted for the last shift stage 20(S−1) if signal CTL(Log$_2$N) is asserted to enable the left N/2 selector circuits 21(S−1)(0) through 21(S−1)(N/2−1) to couple the signal at their respective first input to their respective output, and the right N/2 selector circuits 21(S−1)(N/2) through 21(S−1)(N/2−1) to couple the signal at their respective third input to their respective output, thereby to enable the successive selector circuits 21(S−1)(n) for "n" an even number to couple the signals from the successive selector circuits 21(S−2)(0) through 21(S−2)(N/2−1) (that is, the selectors to the left) in the preceding shift stage 20(S−2) to their respective outputs, and the successive selector circuits 21(S−1)(n) for "n" an odd number to couple the signals from the successive selector circuits 21(S−2)(N/2) through 21(S−2)(N−1) (that is, the selectors to the right) in the preceding shift stage 20(S−2) to their respective outputs, thereby to effect an interleaving of the signals from the left and right selectors in the shift stage 20(S−2), and
 (d) control signals PUSj (pass unshuffle bits) will be asserted for those shift stages 20(0) through 20(S−2) for which control signals CTL1 through CTL((Log$_2$N)−1) are negated and, if the signal CTL(Log$_2$N) is negated, the control signal PASv will be asserted to enable the respective selectors to couple signals at their second inputs to their outputs thereby to enable them to maintain data bits in the same column "n."

Figure 2A:
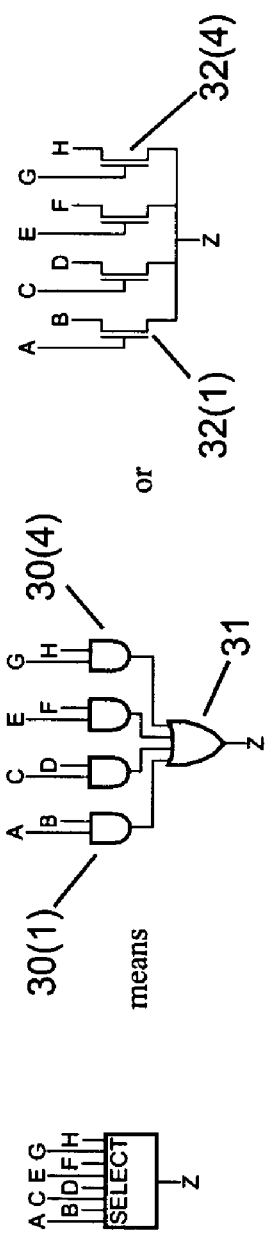
FIGS. 2A and 2B depict logical and circuit implementations of various circuit elements depicted in FIG. 1A.
Figure 2B:
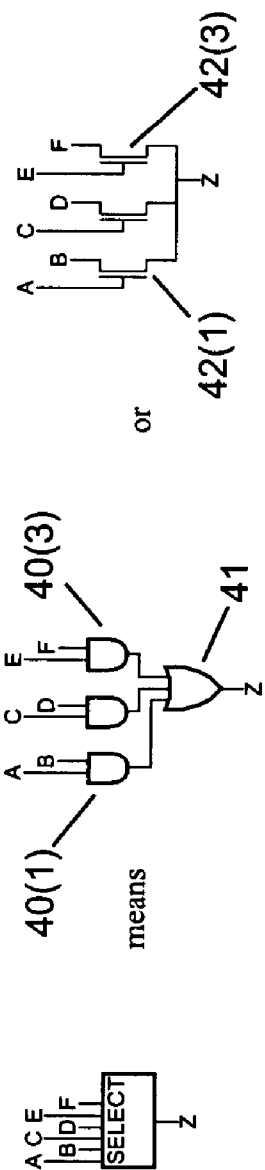

FIGS. 2A and 2B depict illustrative circuits for the selector circuits 21(s)(n), with FIG. 2A depicting an illustrative circuit for a selector circuit with four data signal inputs and FIG. 2B depicting an illustrative circuit for a selector circuit with three data signal inputs. Each FIG. actually depicts both an illustrative logic diagram and an illustrative schematic diagram for the respective selector circuit. With reference to FIG. 2A, an illustrative circuit for a selector circuit 21(s)(n) with four data signal inputs includes four AND gates 30(1) through 30(4), each of which receives one of the data input signals B, D, F or H and the control signal A, C, E or G comprising one of the rearrangement control signals described above. The outputs of the AND gates are coupled to an OR gate 31, which provides an asserted output signal Z if one of the AND gates 30(1) through 30(4) is providing a respective asserted output signal, which will be the case if, for the one of the rearrangement control signals input to the selector circuit, the corresponding data input signal is asserted. Otherwise, the output signal Z will be negated.

Since, for any rearrangement operation, only one control signal A, C, E or G will be asserted, the selector circuit can be implemented using four field-effect transistors (FET's) 32(1) through 32(4) connected as shown in the schematic diagram in FIG. 2A. In particular, the control signals A, C, E and G are applied to the gate terminals of the respective FET's 32(1) through 32(4), the data signals B, D, F and H are applied to the source terminals, and the drain terminals are connected together. Each FET 32(1) through 32(4) essentially forms one of the AND gates 30(1) through 30(4), and the interconnected drain terminals performs the logical OR operation performed by the OR gate 31.

FIG. 2B depicts an illustrative logic diagram and an illustrative schematic diagram for a selector circuit which receives three data input signals B, D and F and associated control signals A, C and E. The selector circuit is similar to the selector circuit described above in connection with FIG. 2A, except that only three AND gates 40(1) through 40(3), or FET's 42(1) through 42(3) are provided, each for a respective one of the data input signals and control signals.

Figure 3:
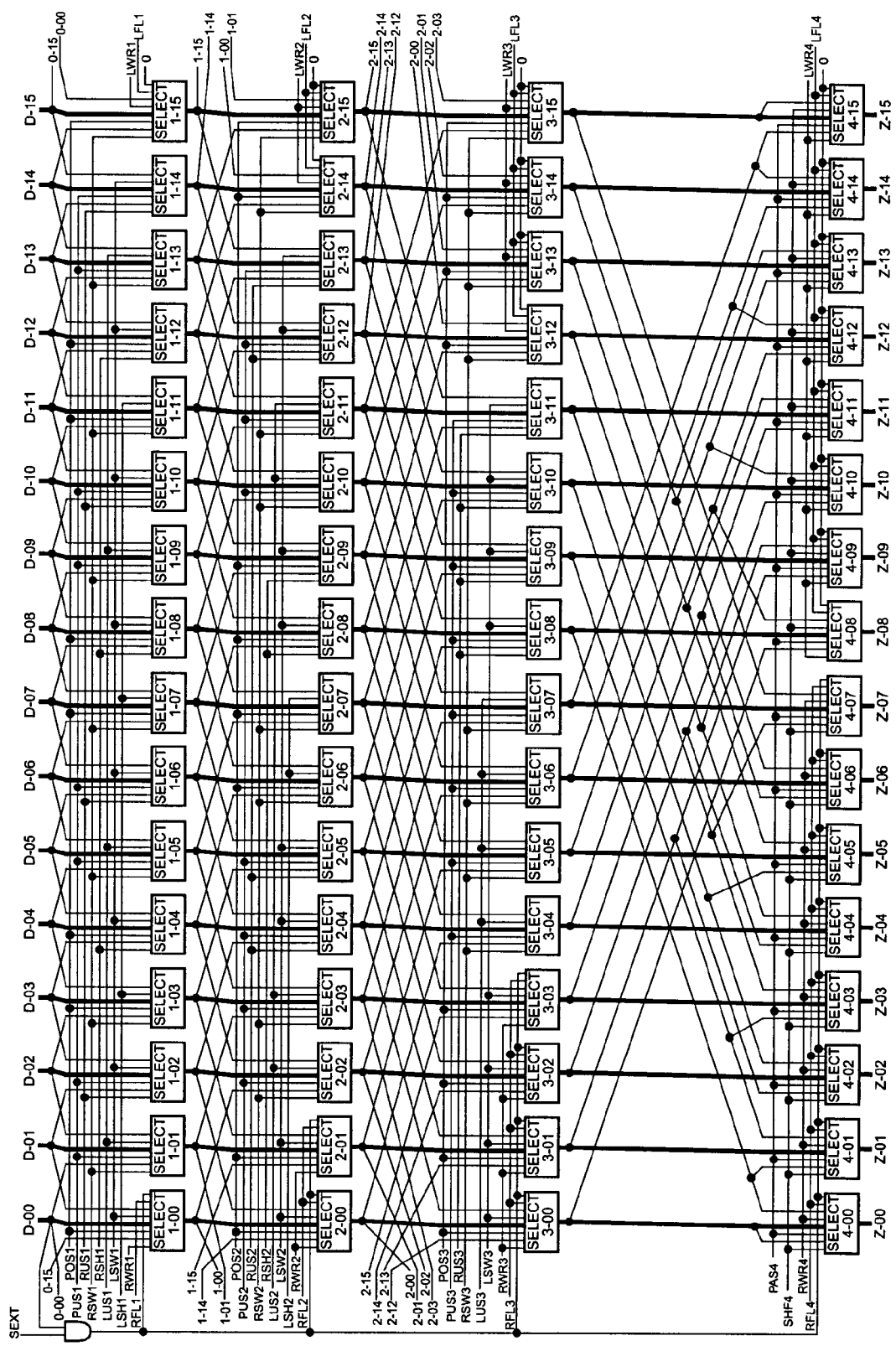
FIG. 3 depicts the flow of data bits through FIG. 1A's shift array during execution of a simple pass-through operation.
Figure 7:
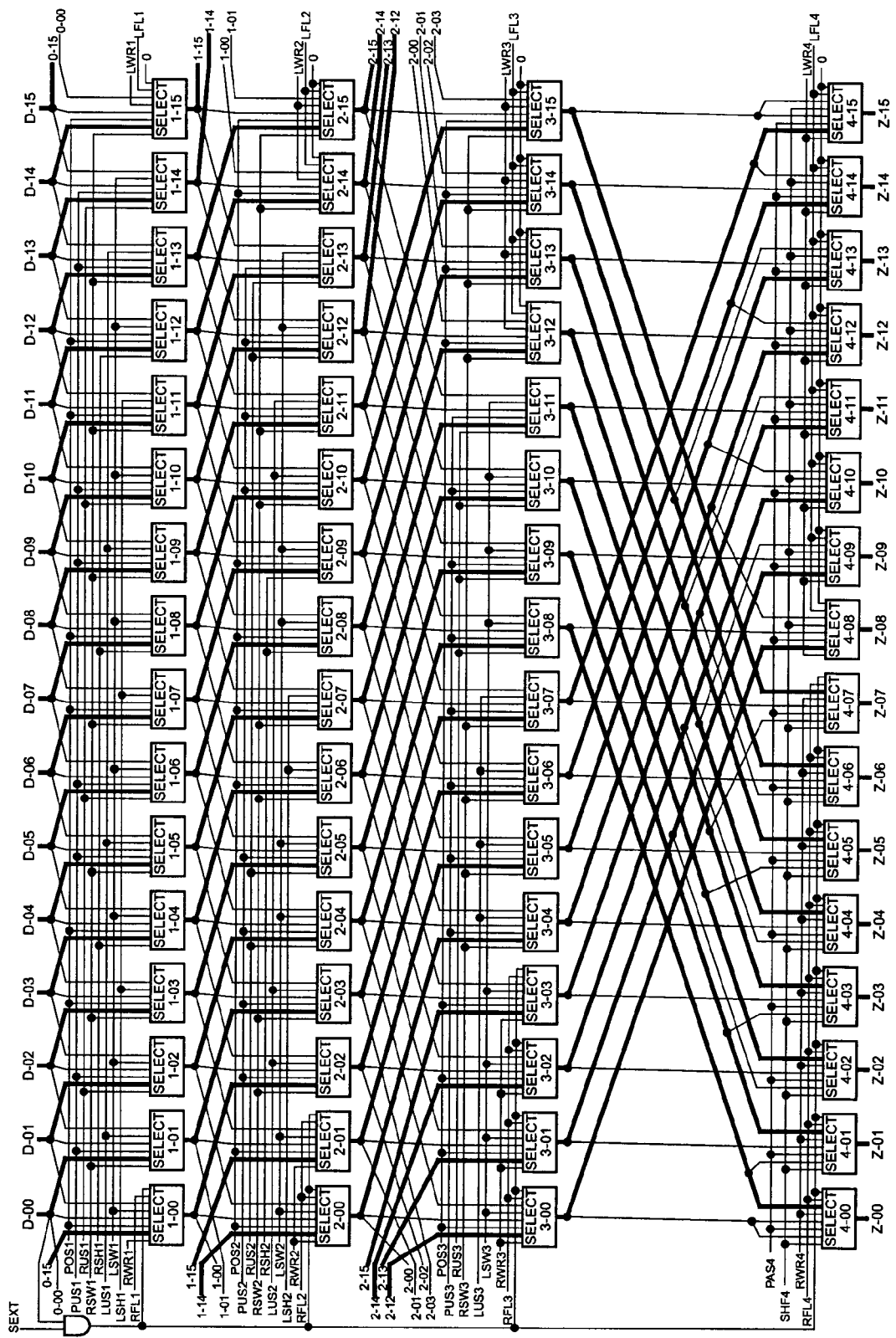
FIG. 7 depicts data flow through FIG. 1A's shift array during execution of a rotate-right operation.
Figure 8:
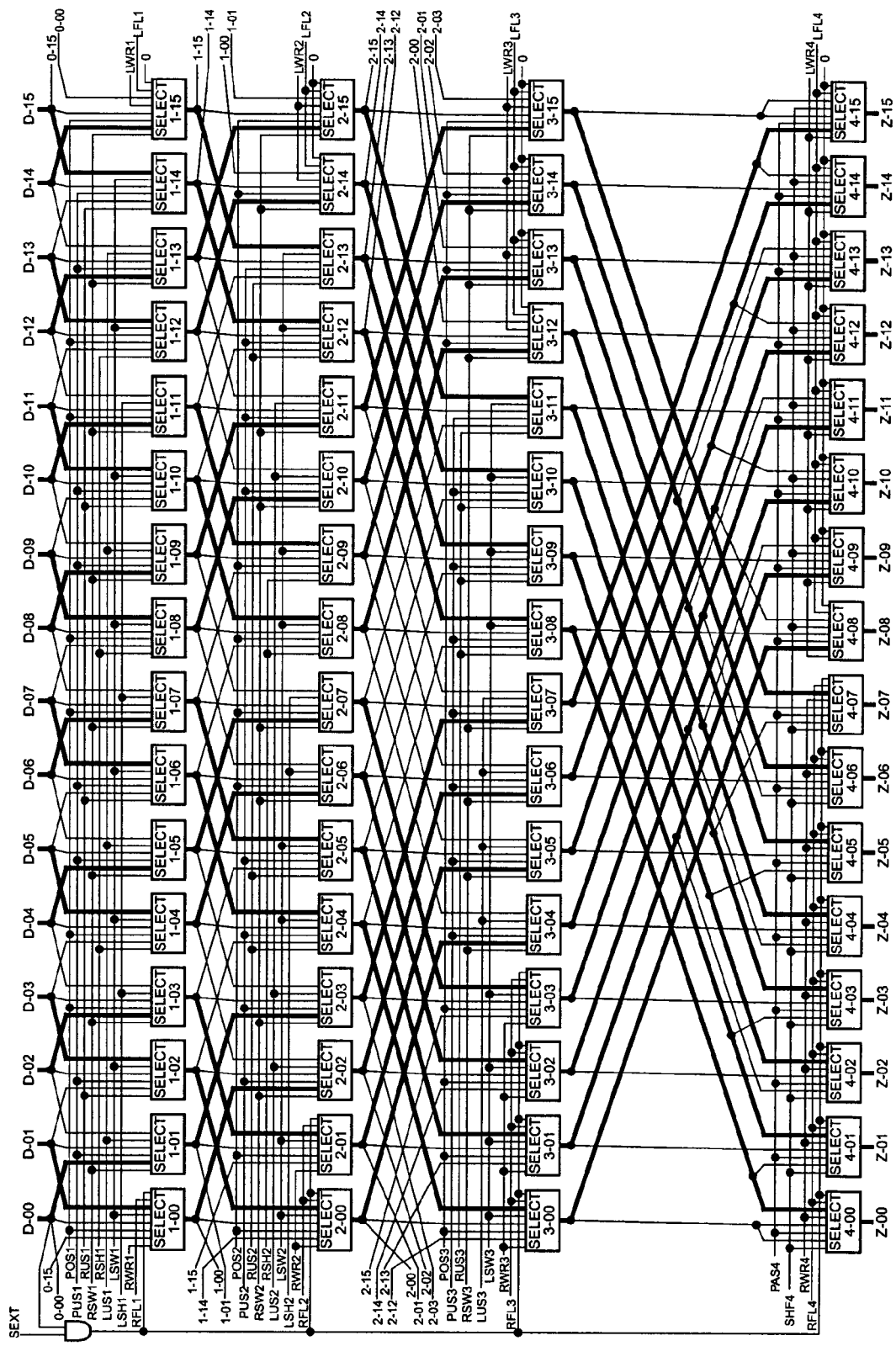
FIG. 8 depicts data flow through FIG. 1A's shift array during execution of a bit-reversal operation.
Figure 9:
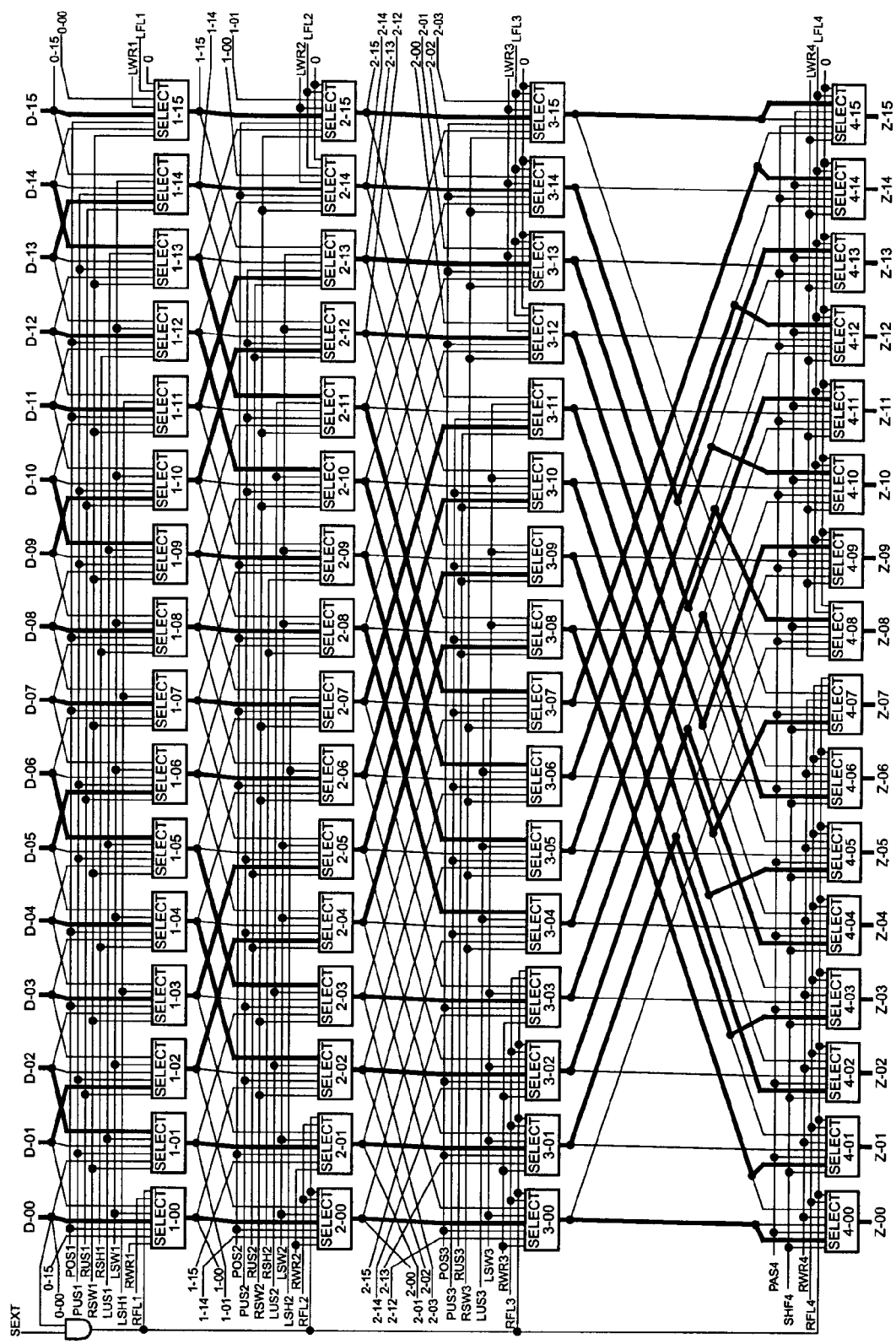
FIG. 9 depicts data flow through FIG. 1A's shift array during execution of a shuffle/unshuffle operation.

FIGS. 3 through 9 depict the flow of data bits through the shift array 11 described above in connection with FIG. 1A for various types of instructions. FIG. 3 depicts the flow of data bits through the shift array 11 when all of the CTLj signals are negated, representing a value for the operand "m" of "zero." FIGS. 4 through 9 depict the flow of data bits through the shift array when all of the CTLj are asserted, representing a value for the operand "m" of "fifteen," for the instructions unsigned shift left (FIG. 4), unsigned or arithmetic shift right (FIG. 5), rotate left (FIG. 6), rotate right (FIG. 7), generalized bit reverse (FIG. 8) and shuffle/unshuffle (FIG. 9).

FIG. 3 depicts the flow of data bits through the shift array 11 when all of the CTLj signals are negated, representing a value of "zero" for the operand "m." With reference to FIG. 3, in that condition all of the POSj (pass outside bits) and PUSj (pass unshuffle bits) control signals will be asserted for shift stages 20(0) through 20(S−2), and the PASv (pass) control signal will be asserted for shift stage 20(S−1), thereby enabling all of the selector circuits 21(n)(s) to couple the signal at their second data inputs to their respective outputs. All of the other control signals will be negated. In that case, the data bits in bit positions D0, D1, . . . DN−1 of the operand data word will be coupled as the bits in the same bit positions Z0, Z1, . . . ,ZN−1, respectively, of the rearranged data word.

Figure 4:
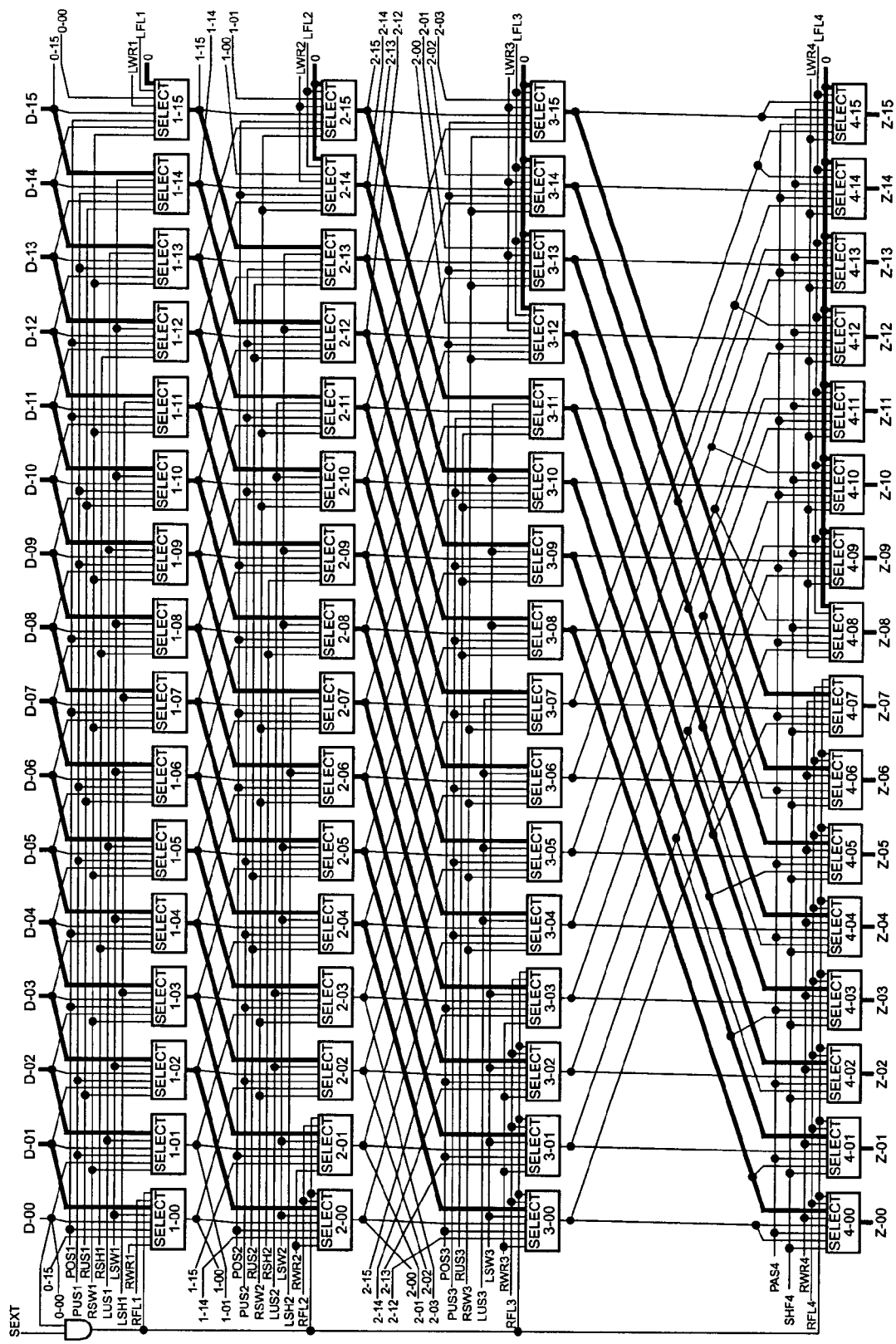
FIG. 4 depicts the flow of data bits through FIG. 1A's shift array during execution of a left-rotation operation.

FIG. 4 depicts the flow of data bits through the shift array when all of the CTLj signals are asserted, representing a value for the operand "m" of "fifteen," for the instruction unsigned shift left. In that case, it is expected that the data bit in bit position DN−1 will be shifted fifteen bit positions to the left, to bit position Z0 of the rearranged data word, and that bits in bit positions Z1, . . . ,ZN−1 will be set to "zero." As described above, the control signals LUSj (left unshuffle), LSWj (left swap), LSHj (left shift) and LFLj (left fill) are asserted for shift stages 20(0) through 20(S−2) to enable the selector circuits 21(0)(0) through 21(0)(N−2), 21(1)(0) through 21(1)(N−3), . . . , 21(S−2)(0) through 21(S−2)(N−1−2$^s$) to couple the signals at their respective third inputs to their respective outputs thereby to enable them to shift data bits to the left, and to enable the selector circuits 21(s)(N−2$^s$) through 21(s)(N−1) to couple signals at their respective fourth inputs to their respective outputs having the value "zero." In addition, control signals LFLv (left fill) and RWRv (right wrap) will be asserted for shift stage 20(S−1) to enable the selector circuits 21(S−1)(0) through 21(S−1)(N/2−1) in the last stage 20(S−1) to couple the signals at their respective third inputs to their respective outputs, thereby to shift the signals from the right N/2 selector circuits 21(S−2)(N/2) through 21(S−2)(N−1) to the left, and to enable the selector circuits 21(S−1)(N/2) through 21(S−1)(N−1) to couple signals at their fourth inputs to their respective outputs having the value "zero." This results in fifteen zeros being shifted into bit positions Z1 through ZN−1 of the rearranged data word and the bit in bit position D15 of the operand data word being shifted into bit position Z0 of the rearranged data word. If a CTLj signal is negated, the selectors 21(j−1)(n) in the corresponding stage 20(j−1) are enabled to, instead of shift the signals representing the associated bits to the left, maintain the bits in the same column, resulting in a smaller shift.

Figure 5:
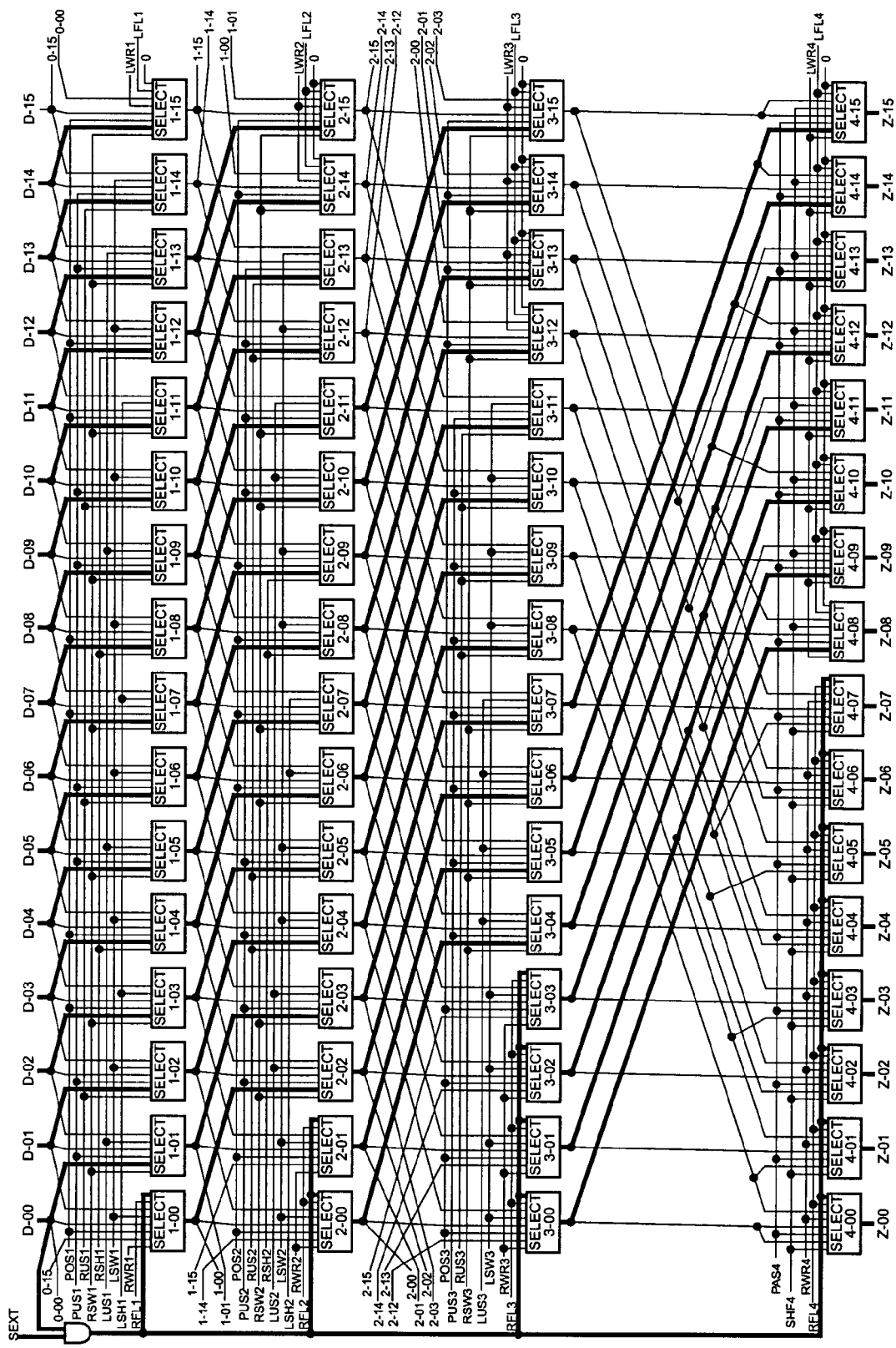
FIG. 5 depicts the flow of data through FIG. 1A's shift array during execution of an arithmetic right-shift operation.

FIG. 5 depicts the flow of data bits through the shift array when all of the CTLj signals are asserted, representing a value for the operand "m" of "fifteen," for the instructions unsigned or arithmetic shift right. As described above, the control signals RUSj (right unshuffle), RSWj (right swap), RSHj (right shift) and RFLj (right fill) are asserted for shift stages 20(0) through 20(S−2) to enable the selector circuits 21(0)(1) through 21(0)(N−1), 21(1)(2) through 21(1)(N−1), . . . , 21(S−2)(3) through 21(S−2)(N−1) to couple the signals at their respective first inputs to their respective outputs thereby to enable them to shift data bits to the right, and to enable the selector circuits 21(s)(0) through 21(s)(N−2$^s$−1) to couple signals at their respective fourth inputs to their respective outputs having the value corresponding to the value represented by the logical AND of the SEXT sign extension signal and a signal representing the value of the bit in bit position D0 of the operand data word. In addition, control signals LFLv (left fill) and RWRv (right wrap) will be asserted for shift stage 20(S−1) to enable the selector circuits 21(S−1)(0) through 21(S−1)(N/2−1) in the last stage 20(S−1) to couple the signals at their respective third inputs to their respective outputs, thereby to shift the signals from the right N/2 selector circuits 21(S−2)(N/2) through 21(S−2)(N−1) to the left, and to enable the selector circuits 21(S−1)(N/2) through 21(S−1)(N−1) to couple signals at their fourth inputs to their respective outputs having the value "zero." This results in fifteen copies of the logical AND of the SEXT sign extension signal and the signal representing the value of the bit in bit position D0 of the operand data word being shifted into bit positions Z0 through ZN−2 of the rearranged data word and the bit in bit position D0 of the operand data word being shifted into bit position Z15 of the rearranged dataword. If a CTLj signal is negated, the selectors 21(j−1)(n) in the corresponding stage 20(j−1) are enabled to, instead of shift the signals representing the associated bits to the right, maintain the bits in the same column, resulting in a smaller shift.

Figure 6:
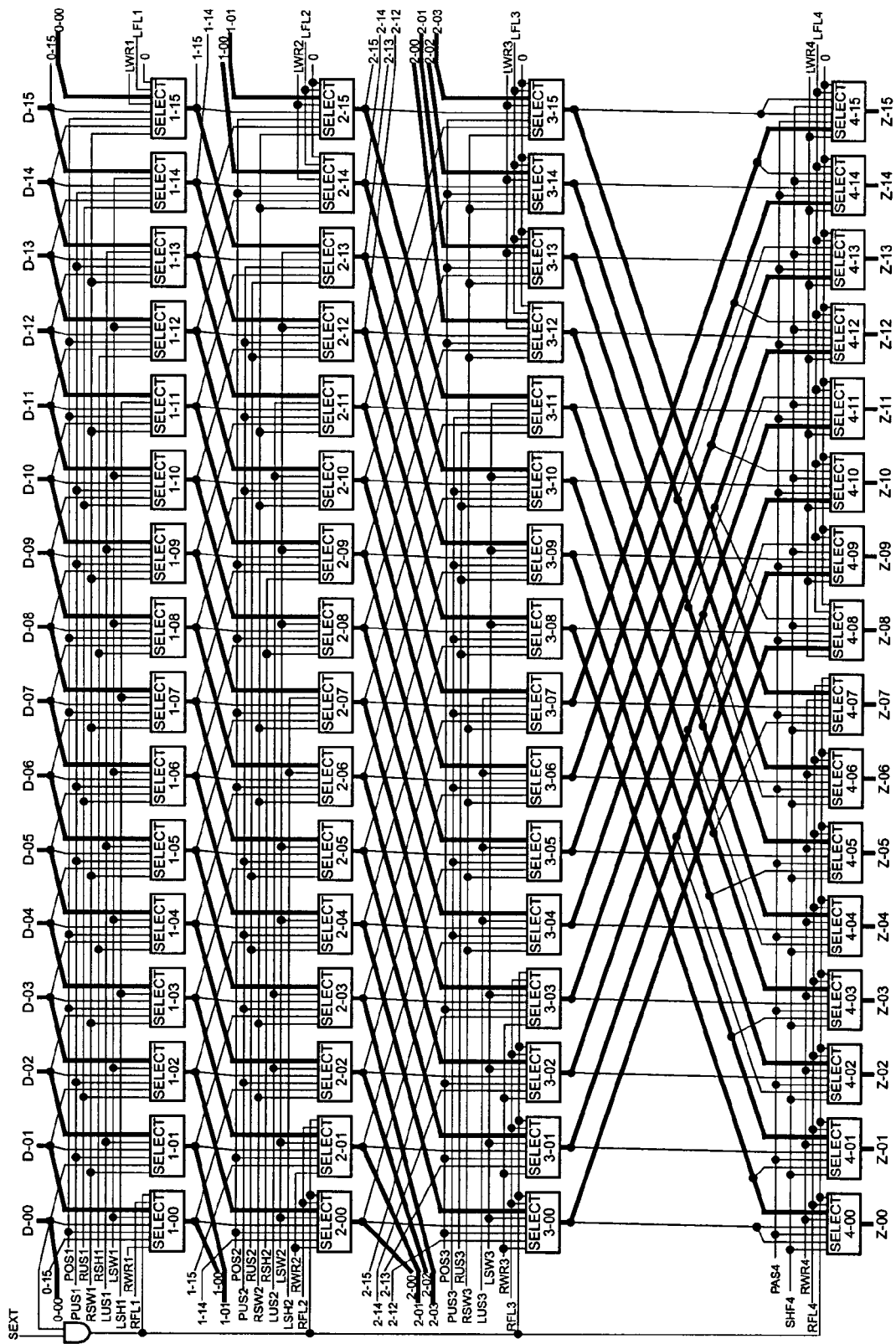
FIG. 6 depicts the data flow through FIG. 1A's shift array during execution of a rotate-left operation.

FIG. 6 depicts the flow of data bits through the shift array when all of the CTLj signals are asserted, representing a value for the operand "m" of "fifteen," for the instruction rotate left. As described above, control signals LUSj (left unshuffle), LSWj (left swap), LSHj (left shift) and LWRj (left wrap) are asserted for shift stages 20(0) through 20(S−2) to enable the selector circuits 21(0)(n) through 21(S−2)(N−1) to couple the signals at their respective third inputs to their respective outputs thereby to enable them to shift data bits to the left (mod N). In addition, control signals LWRv (left wrap) and RWRv (right wrap) will be asserted for shift stage 20(S−1) to enable the selector circuits 21(S−1)(0) through 21(S−1)(N−1) to couple the signals at their respective third inputs to their respective outputs thereby to enable them to shift data bits to the left (mod N). If a CTLj signal is negated, the selectors 21(j−1)(n) in the corresponding stage 20(j−1) are enabled to, instead of shift the signals representing the bits to the left, maintain the bits in the same column, resulting in a smaller shift.

FIG. 7 depicts the flow of data bits through the shift array when all of the CTLj signals are asserted, representing a value for the operand "m" of "fifteen," for the instruction rotate right. As described above, control signals RUSj (right unshuffle), RSWj (right swap), RSHj (right shift) and RWRj (right wrap) are asserted for shift stages 20(0) through 20(S−2) to enable the selector circuits 21(0)(n) through 21(S−2)(N−1) to couple the signals at their respective first inputs to their respective outputs thereby to enable them to shift data bits to the right (mod N). In addition, control signals LWRv (left wrap) and RWRv (right wrap) will be asserted for shift stage 20(S−1) to enable the selector circuits 21(S−1)(0) through 21(S−1)(N−1) to couple the signals at their respective third inputs to their respective outputs thereby to enable them to shift data bits to the right (mod N). If a CTLj signal is negated, the selectors 21(j−1)(n) in the corresponding stage 20(j−1) are enabled to, instead of shift the signals representing the bits to the right, maintain the bits in the same column, resulting in a smaller shift.

FIG. 8 depicts the flow of data bits through the shift array when all of the CTLj signals are asserted, representing a value for the operand "m" of "fifteen," for the instruction generalized bit reverse. In this condition, it is expected that the bits in bit positions D0, D1, . . . , DN−2, DN−1 of the operand data word will be shifted into bit positions ZN−1 ZN−2, . . . , Z1, Z0 or the rearranged data word. As described above, control signals LSWj (left swap) and RSWj (right swap) are asserted for those shift stages 20(0) through 20(S−2) to enable, within each group of $2^{s+1}$ selectors in each shift stage 20(s), the left "$2_s$" selectors in each group to couple signals at their respective third inputs to their respective outputs, and the right "$2_s$" selectors in each group to couple signals at their respective first inputs to their respective outputs, thereby to swap the left and right signals in each group of $2^{s+1}$ selectors. In addition, the control signals LWRv (left wrap RWRv (right wrap) will be asserted for shift stage 20(S−1) to enable the left N/2 selectors to couple signals at their respective third inputs to their respective outputs, and the right N/2 selectors to couple signals at their respective first inputs to their respective outputs, thereby to swap the left and right signals. If a CTLj signal is negated, the selectors 21(j−1)(n) in the corresponding stage 20(j−1) are enabled to, instead of shift the signals representing the bits to the right, maintain the bits in the same column, resulting in a smaller shift. For N=16, the following sixteen rearrangement patterns can be performed for the sixteen different values of "m":

m rearrangement pattern

0 no change

1 swap the bits within each two-bit "tayste"

2 swap the two-bit "taystes" within each four-bit "nibble" reverse the bits within each four-bit "nibble"

4 swap the four-bit "nibbles" within each eight-bit byte
5 (complex)
6 reverse the two-bit "taystes" within each eight-bit byte
7 reverse the bits within each eight-bit byte
8 swap the eight-bit bytes within the sixteen-bit word
9 (complex)
10 (complex)
11 (complex)
12 reverse the four-bit "nibbles" within the sixteen-bit word
13 (complex)
14 reverse the two-bit "taystes" within the sixteen-bit word
15 reverse the bits within the sixteen-bit word Where "(complex)" indicates that a complex rearrangement pattern will result.

FIG. 9 depicts the flow of data bits through the shift array when all of the CTLj signals are asserted, representing a value for the operand "m" of "fifteen," for the instruction shuffle/unshuffle. As described above, control signals POSj (pass outside bits) will be asserted for shift stages 20(0) through 20(S−2) to enable the left and right selector circuits 21(0)(0), 21(0)(3), 21(0)(4), 21(0)(7), . . . in the each nibble (that is, four consecutive selectors) in shift stage 20(0), the two left and right selector circuits 21(1)(0), 21(1)(1), 21(1)(6), 21(1)(7), . . . in each byte (that is, eight consecutive selectors) in shift stage 20(1), the four left and right selector circuits 21(2)(0) through 21(2)(3), 21(2)(12) through 21(2)(15), . . . in each word (that is, sixteen consecutive selectors) in shift stage 20(2) (generally, the left and right $2^s$ selectors in each group of $2^{s+2}$ selectors in each shift stage 20(s), s=0, . . . ,S−2) to couple the signal at their respective second inputs to their respective outputs, thereby to enable them to maintain data bits in the same column "n". In addition, control signals LUSj (left unshuffle) and RUSj (right unshuffle) are asserted for shift stages 20(0) through 20(S−2) to enable, for the middle $2^{s+1}$ selectors in each group of $2^{s+2}$ selectors in each shift stage 20(s) (s=0, . . . ,S−2), the left $2^s$ selectors to couple the signal at their respective third input to their respective output, and the right $2^s$ selectors to couple the signal at their respective first input to their respective output, thereby to effect a swap of the signals as between those selectors. Finally, control signal SHFv (shuffle) will be asserted for the last shift stage 20(S−1) to enable the left N/2 selector circuits 21(S−1)(0) through 21(S−1)(N/2−1) to couple the signal at their respective first input to their respective output, and the right N/2 selector circuits 21(S−1)(N/2) through 21(S−1)(N/2−1) to couple the signal at their respective third input to their respective output, thereby to enable the successive selector circuits 21(S−1)(n) for "n" an even number to couple the signals from the successive selector circuits 21(S−2)(0) through 21(S−2)(N/2−1) (that is, the selectors to the left) in the preceding shift stage 20(S−2) to their respective outputs, and the successive selector circuits 21(S−1)(n) for "n" an odd number to couple the signals from the successive selector circuits 21(S−2)(N/2) through 21(S−2)(N−1) (that is, the selectors to the right) in the preceding shift stage 20(S−2) to their respective outputs, thereby to effect an interleaving of the signals from the left and right selectors in the shift stage 20(S−2). The net effect is that the order of the bits of the rearranged data word is the same as the order of bits of the operand data word.

As with the other instructions, if a CTLj signal is negated, the selectors 21(j−1)(n) in the corresponding stage 20(j−1) are enabled to, instead of shift the signals representing the bits to the right, maintain the bits in the same column, resulting in a smaller shift. Generally, the shift array 11 performs the shuffle/unshuffle operation in S=Log$_2$N steps, with each step being performed in one of the shift stages 20(s), s=0, . . . ,S−1. For shift stage 20(s), 0≦s<S−2 (that is, the first "S−1" steps), the input is divided into sections of size $2^{s+2}$ and each section is divided into chunks of size $2^s$. If the "s-th" bit (from the least significant, or right-most, bit) of the binary representation of "m" is set (that is, has the value "one"), the four chunks of each section are unshuffled and the result becomes the input of the next shift stage 20(s+1). On the other hand, if the "s-th" bit (from the least-significant bit) of the binary representation of "m" is clear (that is, has the value "zero") the output of the stage 20(s), 0≦s<S−2, is the same as the input. For the last "S-th" step, performed by shift stage 20(S−1), if the "S-th" bit (from the least-significant bit) of the binary representation of "n" is set, the bits of the entire word input thereto are shuffled. On the other hand, if the "S-th" bit (from the least-significant bit) of the binary representation of "m" is clear, the output of the shift stage 20(S−1) is the same as the input.

For N=16, the following sixteen rearrangement patterns can be performed for the sixteen If different values of "m":

m=rearrangement pattern
0 no change
1 unshuffle the bits of each four-bit "nibble"
2 unshuffle the two-bit "taystes" of each eight-bit byte
3 unshuffle the bits of each eight-bit byte
4 unshuffle the four-bit "nibbles" within the sixteen-bit word
5 (complex)
6 unshuffle the two-bit "taystes" within the sixteen-bit word
7 unshuffle the bits within the sixteen-bit word
8 shuffle the bits within the sixteen-bit word
9 shuffle the two-bit "taystes" within the sixteen-bit word
10 (complex)
11 shuffle the four-bit "nibbles" within the sixteen-bit word
12 shuffle the bits of each eight-bit byte
13 shuffle the two-bit "taystes" of each eight-bit byte
14 shuffle the bits of each four-bit "nibble"
15 no change Where "(complex)" indicates that a complex rearrangement pattern will result.

The invention provides a number of advantages. In particular, the invention provides a circuit or functional unit for use in connection with execution of various types of instructions for rearranging bits of a data word.

It will be appreciated that a number of modifications may be made to the functional unit 10 as described above in connection with FIGS. 1A through 9. For example, it will be appreciated that the selector circuits 21(s)(n) in successive shift stages 20(s) are interconnected to facilitate shifts as among columns of increasing powers of two from one to $2^{(Log N)-1}$ columns. It will be appreciated, however, that the selector circuits 21(s)(n) of the successive shift stages may instead be interconnected to facilitate shifts as among columns of decreasing powers of two, from $2^{(Log N)-1}$ to one column.

In addition, although the functional unit has been described as using selector circuits 21(s)(n) that selectively couple signals representing bits from the current column "n"

and one column to the left and right (mod N), it will be appreciated that the functional unit can be implemented using selector circuits which can selectively couple signals representing bits from the current column "n" and a plurality of columns to the left and right (mod N). This can provide for a functional unit that uses fewer than $Log_2N$ shift stages $20(s)$. For example, if "N" is thirty-two, the shift array 11 would need five shift stages if implemented using selector circuits $21(s)(n)$ that selectively couple signals representing bits from the current column "n" and one column to the left and right (mod N). On the other hand, if the shift array is implemented using selector circuits $21(n)(s)$ that selectively couple signals representing bits from the current column "n" and three columns to the left and right (mod N), the number of shift stages can be reduced to three It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. For generating an array output signal representing an array output data word in response to a rearrangement input signal and an array input signal representing an array input data word, a functional unit comprising:

A) a series of J stages $S_j$ of selector modules, where $0 \leq j \leq J-1$, with each of which is associated a respective stage input data word and a respective stage output data word, the stage input data word associated with stage $S_0$ being the array input data word, the stage input data word associated with each other stage $S_j$ being the stage output data word associated with stage $S_{j-1}$, the array output data word being the stage output data word associated with stage $S_{J-1}$, each data word comprising a respective ordered set of N data units $D_n$, where n=0, 1, 2, . . . , N-1, each stage comprising N selector modules $M_n$, where n=0, 1, 2 . . . , N-1, each module $M_n$ in a stage receiving, as its pass input data unit, data unit $D_n$ of the stage input data word associated with that stage and generating, as its module output data unit, data unit $D_n$ of the stage output data word associated with that stage, whereby each selector module $M_n$ in a stage is associated with the respective data unit $D_n$ in the stage output data word associated with that stage and is also associated with the corresponding data unit $D_n$ in the stage input data word associated with that stage, at least one of the stages being a shuffle stage, at least one other stage being an unshuffle stage, wherein:

i) each stage is associated with a respective subgroup size;

ii) the selector modules of each unshuffle stage form unshuffle subgroups of s consecutive selector modules, where s is the subgroup size associated with that unshuffle stage, and the stage input and output data words associated with that stage thereby form respective sets of unshuffle subgroups of the data units associated with those selector modules;

iii) the selector modules of each shuffle stage form shuffle subgroups of s consecutive selector modules, where s is the subgroup size associated with that shuffle stage, and the stage input and output data words associated with that stage thereby form shuffle subgroups of the data units associated with those selector modules;

iv) the selector modules in each unshuffle stage are connected to receive as respective unshuffle input data units the data units so selected from the stage input data word associated with that stage that, when those selector modules forward their unshuffle input data units as their respective module output data units, the stage output data word associated with that stage is the result of unshuffling the unshuffle subgroups of the stage input data word associated with that stage; and v) the selector modules in each shuffle stage are connected to receive as respective shuffle input data units the data units so selected from the stage input data word associated with that stage that, when those selector modules forward their shuffle input data units as their respective module output data units, the stage output data word associated with that stage is the result of shuffling the shuffle subgroups of the stage input data word associated with that stage; and B) a control circuit that interprets at least a plurality of the rearrangement input signal's possible values as calling for shuffle/unshuffle operations employing different selected combinations of the stages and so controls the stages in response to the rearrangement input signal that, when the rearrangement input signal assumes one of the values in that plurality:

i) each selector module in an unshuffle stage forwards its unshuffle input data unit as its module output data unit when the selected combination of stages called for by the rearrangement input signal includes that stage;

ii) each selector module in a shuffle stage forwards its shuffle input data unit as its module output data unit when the selected combination of stages called for by the rearrangement input signal includes that stage; and iii) each selector module in a stage forwards its pass input data unit as its module output data unit when the selected combination of stages called for by the rearrangement input signal excludes that stage.

2. A functional unit as defined in claim 1 wherein:

A) a plurality of the stages are unshuffle stages;

B) the unshuffle subgroups of selector modules in each unshuffle stage form unshuffle groups, each of which comprises a different plurality of consecutive subgroups, and the stage input and output data words associated with that stage thereby form unshuffle groups of the subgroups of data units associated with those selector modules; and C) the selector modules in each unshuffle group of selector modules are connected to receive as their respective unshuffle input data units the data units so selected from the data units in the subgroups of data units belonging to the corresponding unshuffle group of data units in the stage input data word associated with that stage that, when those selector modules forward their unshuffle input data units as their respective module output data units, the corresponding unshuffle group of data units in the stage output word associated with that stage is the result of unshuffling the subgroups of data units within the individual corresponding unshuffle group of data units in the stage input data word associated with that stage.

3. A functional unit as defined in claim 2 wherein the selector modules in each shuffle stage are connected to receive as respective shuffle input data units the data units so selected from the stage input data word associated with that stage that, when those selector modules forward their shuffle input data units as their respective module output data units, the stage output data word associated with that stage is the result of shuffling, within the whole input data word associated with that stage, the shuffle subgroups thereof.

4. A functional unit as defined in claim 3 wherein the number of shuffle stages is one and the subgroup size associated with the shuffle stage is one.

5. A functional unit as defined in claim 4 wherein each subgroup size with which an unshuffle stage is associated is a different one of the values $2^k$ such that 0 k J−2.

6. A functional unit as defined in claim 5 wherein the respective subgroup size with which each unshuffle stage $S_j$ is associated is $2^j$.

7. A functional unit as defined in claim 6 wherein:
   A) the selector modules of each unshuffle stage are so divided into the unshuffle groups as to include a different unshuffle group associated with each integer n<N such that n/4s is a non-negative integer, where s is the subgroup size with which that unshuffle stage is associated;
   B) in each unshuffle stage, each unshuffle group associated with an integer n consists of every selector module $M_k$ in that stage such that n k n+4s−1, where s is the subgroup size with which that unshuffle stage is associated; and
   C) in each unshuffle stage, each unshuffle group of selector modules associated with an integer n is divided into first, second, third, and fourth unshuffle subgroups of s consecutive selector modules, where s is the subgroup size with which that unshuffle stage is associated, such that the first unshuffle subgroup of collector modules includes selector module $M_n$, the second unshuffle subgroup of collector modules includes selector module $M_{m+s}$, the third unshuffle subgroup of collector modules includes selector module $M_{n+2}s$, and the fourth unshuffle subgroup of collector modules includes selector module $M_{n+3s}$.

8. A functional unit as defined in claim 7 wherein:
   A) each selector module $M_n$ in the second unshuffle subgroup in an unshuffle group of selector modules in a stage associated with a subgroup size s is connected to receive as its left-rotate input data unit the data unit $D_{n+s}$ in the stage input data word associated with that stage;
   B) each selector module $M_n$ in the third unshuffle subgroup in an unshuffle group of selector modules in a stage associated with a subgroup size s is connected to receive as its right-rotate input data unit the data unit $D_{n-s}$ in the stage input data word associated with that stage;
   C) the unshuffle input data units of the selector modules $M_n$ in the second and third unshuffle subgroups are respectively the left- and right-rotate input data units thereof;
   D) the unshuffle input data units of the selector modules $M_n$ in the first and fourth unshuffle subgroups are the pass input data units thereof; and
   E) the shuffle input data unit of each selector module $M_n$ in the shuffle stage is the data unit $D_d$ of the input data word associated with that stage, where:
      i) d=n/2 if n is even; and
      ii) d=(N/2)+(n−1)/2 if n is odd.

9. A functional unit as defined in claim 8 wherein:
   A) each of the stages is associated with a subgroup size that equals a different one of the values $s=2^k$, where k is a nonnegative integer less than J;
   B) each stage associated with a subgroup size s is organized as a group set consisting of a different reversal group associated with each value of n<N such that n/2s is a non-negative integer, the reversal group associated with the value n consisting of selector modules $M_k$ such that n k n+2s−1 and being so divided into first and second reversal subgroups of s consecutive selector modules that the first reversal subgroup includes selector module $M_n$ and the second reversal subgroup includes selector module $M_{n+s}$;
   C) each selector module $M_n$ in the first reversal subgroup of a reversal group of selector modules in a stage associated with a subgroup size s is connected to receive as its left-rotate input data unit the data unit $D_{n+s}$ in the stage input data word associated with that stage;
   D) each selector module $M_n$ in the second reversal subgroup of a reversal group of selector modules in a stage associated with a subgroup size s is connected to receive as its right-rotate input data unit the data unit $D_{n-s}$ in the stage input data word associated with that stage; and
   E) the control circuit interprets a plurality of the rearrangement input signal's possible values as calling for reversal operations employing different selected combinations of the stages and so controls the stages in response to such values that:
      i) each selector module in each first reversal subgroup in a stage forwards its left-rotate input data unit as its module output data unit when the selected combination of stages called for by the rearrangement input signal includes that stage;
      ii) each selector module in each second reversal subgroup in a stage forwards its right-rotate input data unit as its module output data unit when the selected combination of stages called for by the rearrangement input signal includes that stage; and
      iii) each selector module in a stage forwards its pass input data unit as its module output data unit when the selected combination of stages called for by the rearrangement input signal excludes that stage.

10. A functional unit as defined in claim 9 wherein:
   A) in each stage associated with a subgroup size s, each selector module $M_n$ such that n s is connected to receive as its right-rotate input data unit the data unit $D_{n-s}$ in the stage input data word associated with that stage; and
   B) the control circuit interprets a plurality of the rearrangement signal's possible values as calling for a right-shift operation employing different selected combinations of the stages and so controls the stages in response to such values that:
   i) in each stage associated with a subgroup size s, each selector module $M_n$ such that n s forwards its right-rotate input data unit as its module output data unit when the selected combination of stages called for by the rearrangement input signal includes that stage; and
   ii) each selector module in a stage forwards its pass input data unit as its module output data unit when the selected combination of stages called for by the rearrangement input signal excludes that stage.

11. A functional unit as defined in claim 10 wherein:
A) in each stage associated with a subgroup size s, each selector module $M_n$ such that n<N−s is connected to receive as its right-rotate input data unit the data unit $D_{n+s}$ in the stage input data word associated with that stage; and
B) the control circuit interprets a plurality of the rearrangement signal's possible values as calling for left-shift operations employing different selected combinations of the stages and so controls the stages in response to such values that:
   i) in each stage associated with a subgroup size s, each selector module $M_n$ such that n<N−s forwards its right-rotate input data unit as its module output data unit when the selected combination of stages called for by the rearrangement input signal includes that stage; and
   ii) each selector module in a stage forwards its pass input data unit as its module output data unit when the selected combination of stages called for by the rearrangement input signal excludes that stage.

12. A functional unit as defined in claim 11 wherein:
A) each selector module $M_n$ in each stage associated with a subgroup size s is connected to receive as its right-rotate input data unit the data unit $D_{(n-s)modN}$ in the stage input data word associated with that stage; and
B) the control circuit interprets a plurality of the rearrangement signal's possible values as calling for right-rotate operations employing different selected combinations of the stages and so controls the stages in response to such values that:
   i) in each stage associated with a subgroup size s, each selector module $M_n$ forwards its right-rotate input data unit as its module output data unit when the selected combination of stages called for by the rearrangement input signal includes that stage; and
   ii) each selector module in a stage forwards its pass input data unit as its module output data unit when the selected combination of stages called for by the rearrangement input signal excludes that stage.

13. A functional unit as defined in claim 12 wherein:
A) each selector module $M_n$ in each stage associated with a subgroup size s is connected to receive as its left-rotate input data unit the data unit $D_{(n+s)modN}$ in the stage input data word associated with that stage; and
B) the control circuit interprets a plurality of the rearrangement signal's possible values as calling for a left-rotate operation employing different selected combinations of the stages and so controls the stages in response to such values that:
   i) in each stage associated with a subgroup size s, each selector module $M_n$ forwards its left-rotate input data unit as its module output data unit when the selected combination of stages called for by the rearrangement input signal includes that stage; and
   ii) each selector module in a stage forwards its pass input data unit as its module output data unit when the selected combination of stages called for by the rearrangement input signal excludes that stage.

14. A functional unit as defined in claim 11 wherein:
A) in each stage associated with a subgroup size s, every selector module $M_n$ such that n<s is connected to receive a common left-extension value as its left-extend input data unit; and
B) when the control circuit receives a rearrangement signal that it interprets as calling for a right-shift operation, it causes each selector module $M_n$ such that n<s in a stage associated with a subgroup size s and belonging to the selected combination of stages to forward its left-extend input data unit as its module output data unit.

15. A functional unit as defined in claim 14 wherein:
A) in each stage associated with a subgroup size s, each selector module $M_n$ such that n N−s is connected to receive as its right-extend input data unit a common right-extension value; and
B) when the control circuit receives a rearrangement signal that it interprets as calling for a left-shift operation, it causes the each selector module $M_n$ such that n N−s in a stage associated with a subgroup size s and belonging to the selected combination of stages to forward its right-extend input data unit as its module output data unit.

16. A functional unit as defined in claim 4 wherein:
A) the selector modules of each unshuffle stage are so divided into the unshuffle groups as to include a different unshuffle group associated with each integer n<N such that n/4s is a non-negative integer, where s is the subgroup size with which that unshuffle stage is associated;
B) in each unshuffle stage, each unshuffle group associated with an integer n consists of every selector module $M_k$ in that stage such that n k n+4s−1, where s is the subgroup size with which that unshuffle stage is associated; and
C) in each unshuffle stage, each unshuffle group of selector modules associated with an integer n is divided into first, second, third, and fourth unshuffle subgroups of s consecutive selector modules, where s is the subgroup size with which that unshuffle stage is associated, such that the first unshuffle subgroup of collector modules includes selector module $M_n$, the second unshuffle subgroup of collector modules includes selector module $M_{n+s}$, the third unshuffle subgroup of collector modules includes selector module $M_{n+2s}$, and the fourth unshuffle subgroup of collector modules includes selector module $M_{n+3s}$.

17. A functional unit as defined in claim 16 wherein:
A) each selector module $M_n$ in the second unshuffle subgroup in an unshuffle group of selector modules in a stage associated with a subgroup size s is connected to receive as its left-rotate input data unit the data unit $D_{n+s}$ in the stage input data word associated with that stage;
B) each selector module $M_n$ in the third unshuffle subgroup in an unshuffle group of selector modules in a stage associated with a subgroup size s is connected to receive as its right-rotate input data unit the data unit $D_{n-s}$ in the stage input data word associated with that stage;
C) the unshuffle input data units of the selector modules $M_n$ in the second and third unshuffle subgroups are respectively the left- and right-rotate input data units thereof;

D) the unshuffle input data units of the selector modules $M_n$ in the first and fourth unshuffle subgroups are the pass input data units thereof; and
E) the shuffle input data unit of each selector module $M_n$ in the shuffle stage is the data unit $D_d$ of the input data word associated with that stage, where:
  i) d=n/2 if n is even; and
  ii) d=(N/2)+(n−1)/2 if n is odd.

18. A functional unit as defined in claim 4 wherein:
A) the rearrangement input signal includes a plurality of stage-selection signals, each of which is associated with a different one of the stages;
B) when any of the stage-selection signals assumes a first, selection value, the control circuit interprets the rearrangement input signal as calling for the stage with which that stage-selection signal is associated to be included in the selected combination of stages; and
C) when any of the stage-selection signals assumes a second, de-selection value, the control circuit interprets the rearrangement input signal as calling for the stage with which that stage-selection signal is associated to be excluded from the selected combination of stages.

19. A functional unit as defined in claim 4 wherein:
A) each of the stages is associated with a subgroup size that equals a different one of the values $s=2^k$, where k is a nonnegative integer less than J;
B) each stage associated with a subgroup size s is organized as a group set consisting of a different reversal group associated with each value of n<N such that n/2s is a non-negative integer, the reversal group associated with the value n consisting of selector modules $M_k$ such that n k n+2s−1 and being so divided into first and second reversal subgroups of s consecutive selector modules that the first reversal subgroup includes selector module $M_n$ and the second reversal subgroup includes selector module $M_{n+s}$;
C) each selector module $M_n$ in the first reversal subgroup of a reversal group of selector modules in a stage associated with a subgroup size s is connected to receive as its left-rotate input data unit the data unit $D_{n+s}$ in the stage input data word associated with that stage;
D) each selector module $M_n$ in the second reversal subgroup of a reversal group of selector modules in a stage associated with a subgroup size s is connected to receive as its right-rotate input data unit the data unit $D_{n-s}$ in the stage input data word associated with that stage; and
E) the control circuit interprets a plurality of the rearrangement input signal's possible values as calling for reversal operations employing different selected combinations of the stages and so controls the stages in response to such values that:
  i) each selector module in each first reversal subgroup in a stage forwards its left-rotate input data unit as its module output data unit when the selected combination of stages called for by the rearrangement input signal includes that stage;
  ii) each selector module in each second reversal subgroup in a stage forwards its right-rotate input data unit as its module output data unit when the selected combination of stages called for by the rearrangement input signal includes that stage; and
  iii) each selector module in a stage forwards its pass input data unit as its module output data unit when the selected combination of stages called for by the rearrangement input signal excludes that stage.

20. A functional unit as defined in claim 4 wherein:
A) in each stage associated with a subgroup size s, each selector module $M_n$ such that n s is connected to receive as its right-rotate input data unit the data unit $D_{n-s}$ in the stage input data word associated with that stage; and
B) the control circuit interprets a plurality of the rearrangement signal's possible values as calling for a right-shift operation employing different selected combinations of the stages and so controls the stages in response to such values that:
  i) in each stage associated with a subgroup size s, each selector module $M_n$ such that n s forwards its right-rotate input data unit as its module output data unit when the selected combination of stages called for by the rearrangement input signal includes that stage; and
  ii) each selector module in a stage forwards its pass input data unit as its module output data unit when the selected combination of stages called for by the rearrangement input signal excludes that stage.

21. A functional unit as defined in claim 20 wherein:
A) in each stage associated with a subgroup size s, every selector module $M_n$ such that n<s is connected to receive a common left-extension value as its left-extend input data unit; and
B) when the control circuit receives a rearrangement signal that it interprets as calling for a right-shift operation, it causes each selector module $M_n$ such that n<s in a stage associated with a subgroup size s and belonging to the selected combination of stages to forward its left-extend input data unit as its module output data unit.

22. A functional unit as defined in claim 20 wherein:
A) each selector module $M_n$ in each stage associated with a subgroup size s is connected to receive as its right-rotate input data unit the data unit $D_{(n-s)modN}$ in the stage input data word associated with that stage; and
B) the control circuit interprets a plurality of the rearrangement signal's possible values as calling for right-rotate operations employing different selected combinations of the stages and so controls the stages in response to such values that:
  i) in each stage associated with a subgroup size s, each selector module $M_n$ forwards its right-rotate input data unit as its module output data unit when the selected combination of stages called for by the rearrangement input signal includes that stage; and
  ii) each selector module in a stage forwards its pass input data unit as its module output data unit when the selected combination of stages called for by the rearrangement input signal excludes that stage.

23. A functional unit as defined in claim 4 wherein:
A) in each stage associated with a subgroup size s, each selector module $M_n$ such that n<N−s is connected to receive as its right-rotate input data unit the data unit $D_{n+s}$ in the stage input data word associated with that stage; and
B) the control circuit interprets a plurality of the rearrangement signal's possible values as calling for left-shift operations employing different selected combinations of the stages and so controls the stages in response to such values that:
  i) in each stage associated with a subgroup size s, each selector module $M_n$ such that n<N−s forwards its right-rotate input data unit as its module output data unit when the selected combination of stages called for by the rearrangement input signal includes that stage; and ii) each selector module in a stage forwards its pass input data unit as its module output data unit when the selected combination of stages called for by the rearrangement input signal excludes that stage.

24. A functional unit as defined in claim 23 wherein:

A) in each stage associated with a subgroup size s, each selector module $M_n$ such that n N−s is connected to receive as its right-extend input data unit a common right-extension value; and B) when the control circuit receives a rearrangement signal that it interprets as calling for a left-shift operation, it causes the each selector module $M_n$ such that n N−s in a stage associated with a subgroup size s and belonging to the selected combination of stages to forward its right-extend input data unit as its module output data unit.

25. A functional unit as defined in claim 23 wherein:

A) each selector module $M_n$ in each stage associated with a subgroup size s is connected to receive as its left-rotate input data unit the data unit $D_{(n+s) mod N}$ in the stage input data word associated with that stage; and B) the control circuit interprets a plurality of the rearrangement signal's possible values as calling for a left-rotate operation employing different selected combinations of the stages and so controls the stages in response to such values that:

i) in each stage associated with a subgroup size s, each selector module $M_n$ forwards its left-rotate input data unit as its module output data unit when the selected combination of stages called for by the rearrangement input signal includes that stage; and ii) each selector module in a stage forwards its pass input data unit as its module output data unit when the selected combination of stages called for by the rearrangement input signal excludes that stage.

26. A functional unit as defined by claim 1 wherein each data unit is a single bit.

27. A functional unit as defined by claim 1 wherein each data unit is a single bit.

28. For generating an array-output signal representing an array output data word in response to an array-input signal representing an array input data word, a functional unit comprising:

A) a series of J stages $S_j$ of selector modules, where j=0, 1, 2, . . . , J−1, with each of which is associated a respective stage input data word and a respective stage output data word, the stage input data word associated with stage $S_0$ being the array input data word, the stage input data word associated with each other stage $S_j$ being the stage output data word associated with stage $S_{j-1}$, the array output data word being the stage output data word associated with stage $S_{J-1}$, each data word comprising a respective ordered set of N data units $D_n$, where n=0, 1, 2, . . . , N−1, each stage comprising N selector modules $M_n$, where n=0, 1, 2 . . , N−1, each module $M_n$ in a stage receiving, as its pass input data unit, data unit $D_n$ of the stage input data word associated with that stage and generating, as its module output data unit, data unit $D_n$ of the stage output data word associated with that stage, whereby each selector module $M_n$ in a stage is associated with the respective data unit $D_n$ in the stage output data word associated with that stage and is also associated with the corresponding data unit $D_n$ in the stage input data word associated with that stage, wherein:

i) each stage is associated with a different respective subgroup size s selected from among the values $2^0, \ldots, 2^{J-1}$;

ii) each stage associated with a subgroup size s is organized as a group set consisting of a different reversal group associated with each value of n<N such that n/2s is a non-negative integer, the reversal group associated with the value n consisting of selector modules $M_k$ such that n k n+2s−1 and being so divided into first and second reversal subgroups of s consecutive selector modules that the first reversal subgroup includes selector module $M_n$ and the second reversal subgroup includes selector module $M_{n+s}$;

iii) each selector module $M_n$ in the first reversal subgroup of a reversal group of selector modules in a stage associated with a subgroup size s is connected to receive as its left-rotate input data unit the data unit $D_{n+s}$ in the stage input data word associated with that stage; and iv) each selector module $M_n$ in the second reversal subgroup of a reversal group of selector modules in a stage associated with a subgroup size s is connected to receive as its right-rotate input data unit the data unit $D_{n-s}$ in the stage input data word associated with that stage; and B) a control circuit that so controls the stages in response to a rearrangement input signal among whose possible values the control circuit interprets at least a plurality as calling for a reversal operation employing different selected combinations of the stages that, when the rearrangement input signal assumes one of that plurality of values:

i) each selector module in each said first reversal subgroup in a stage forwards its left-rotate input data unit as its module output data unit when the selected combination of stages called for by the rearrangement input signal includes that stage;

ii) each selector module in each said second reversal subgroup in a stage forwards its right-rotate input data unit as its module output data unit when the selected combination of stages called for by the rearrangement input signal includes that stage; and iii) each selector module in a stage forwards its pass input data unit as its module output data unit when the selected combination of stages called for by the rearrangement input signal excludes that stage.

29. A functional unit as defined in claim 28 wherein:

A) in each stage associated with a subgroup size s, each selector module $M_n$ such that n s is connected to receive as its right-rotate input data unit the data unit $D_{n-s}$ in the stage input data word associated with that stage; and B) the control circuit interprets a plurality of the rearrangement signal's possible values as calling for a right-shift operation employing different selected combinations of the stages and so controls the stages in response to such values that:

i) in each stage associated with a subgroup size s, each selector module $M_n$ such that n s forwards its right-rotate input data unit as its module output data unit when the selected combination of stages called for by the rearrangement input signal includes that stage; and ii) each selector module in a stage forwards its pass input data unit as its module output data unit when the selected combination of stages called for by the rearrangement input signal excludes that stage.

30. A functional unit as defined in claim 29 wherein:
A) in each stage associated with a subgroup size s, each selector module $M_n$ such that n<N−s is connected to receive as its right-rotate input data unit the data unit $D_{n+s}$ in the stage input data word associated with that stage; and
B) the control circuit interprets a plurality of the rearrangement signal's possible values as calling for left-shift operations employing different selected combinations of the stages and so controls the stages in response to such values that:
   i) in each stage associated with a subgroup size s, each selector module $M_n$ such that n<N−s forwards its right-rotate input data unit as its module output data unit when the selected combination of stages called for by the rearrangement input signal includes that stage; and
   ii) each selector module in a stage forwards its pass input data unit as its module output data unit when the selected combination of stages called for by the rearrangement input signal excludes that stage.

31. A functional unit as defined in claim 30 wherein:
A) each selector module $M_n$ in each stage associated with a subgroup size s is connected to receive as its right-rotate input data unit the data unit $D_{(n-s) mod N}$ in the stage input data word associated with that stage; and
B) the control circuit interprets a plurality of the rearrangement signal's possible values as calling for right-rotate operations employing different selected combinations of the stages and so controls the stages in response to such values that:
   i) in each stage associated with a subgroup size s, each selector module $M_n$ forwards its right-rotate input data unit as its module output data unit when the selected combination of stages called for by the rearrangement input signal includes that stage; and
   ii) each selector module in a stage forwards its pass input data unit as its module output data unit when the selected combination of stages called for by the rearrangement input signal excludes that stage.

32. A functional unit as defined in claim 31 wherein:
A) each selector module $M_n$ in each stage associated with a subgroup size s is connected to receive as its left-rotate input data unit the data unit $D_{(n+s) mod N}$ in the stage input data word associated with that stage; and
B) the control circuit interprets a plurality of the rearrangement signal's possible values as calling for a left-rotate operation employing different selected combinations of the stages and so controls the stages in response to such values that:
   i) in each stage associated with a subgroup size s, each selector module $M_n$ forwards its left-rotate input data unit as its module output data unit when the selected combination of stages called for by the rearrangement input signal includes that stage; and
   ii) each selector module in a stage forwards its pass input data unit as its module output data unit when the selected combination of stages called for by the rearrangement input signal excludes that stage.

33. A functional unit as defined in claim 30 wherein:
A) in each stage associated with a subgroup size s, every selector module $M_n$ such that n<s is connected to receive a common left-extension value as its left-extend input data unit; and
B) when the control circuit receives a rearrangement signal that it interprets as calling for a right-shift operation, it causes each selector module $M_n$ such that n<s in a stage associated with a subgroup size s and belonging to the selected combination of stages to forward its left-extend input data unit as its module output data unit.

34. A functional unit as defined in claim 33 wherein:
A) in each stage associated with a subgroup size s, each selector module $M_n$ such that n N−s is connected to receive as its right-extend input data unit a common right-extension value; and
B) when the control circuit receives a rearrangement signal that it interprets as calling for a left-shift operation, it causes the each selector module $M_n$ such that n N−s in a stage associated with a subgroup size s and belonging to the selected combination of stages to forward its right-extend input data unit as its module output data unit.

35. A method of performing a rearrangement operation by generating an array output signal representing an array output data word in response to a rearrangement input signal and an array input signal representing an array input data word, wherein:
A) the rearrangement operation is performed in a series of J stages $S_j$, where $0 \leq j \leq J-1$, with each of which is associated a respective stage input data word and a respective stage output data word, the stage input data word associated with stage $S_0$ being the array input data word, the stage input data word associated with each other stage $S_j$ being the stage output data word associated with stage $S_{j-1}$, the array output data word being the stage output data word associated with stage $S_{J-1}$, each data word comprising a respective ordered set of N data units $D_n$, where n=0, 1, 2, ..., N−1, at least one of the stages being a shuffle stage, at least one other stage being an unshuffle stage;
B) each stage is associated with a respective subgroup size;
C) the data units of each stage input word associated with an unshuffle stage form unshuffle subgroups of s consecutive data units, where s is the subgroup size associated with that unshuffle stage, and the corresponding data units of the stage output word associated with that stage form corresponding unshuffle subgroups;
D) the method includes interpreting at least a plurality of the rearrangement input signal's possible values as calling for shuffle/unshuffle operations employing different selected combinations of the stages; and
E) when the rearrangement input signal calls for a shuffle/unshuffle operation employing a selected combination of stages, the rearrangement operation includes:
   i) in each unshuffle stage in the combination of stages called for by the rearrangement input signal, generating the stage output data word associated therewith by forwarding as that stage output word's data units the data units so selected from the stage input data word associated with that stage that the stage output data word associated with that stage is the result of unshuffling the unshuffle subgroups of the stage input data word associated with that stage;
   ii) in each shuffle stage in the combination of stages called for by the rearrangement input signal, generating the stage output data word associated therewith by forwarding as that stage output word's data units the data units so selected from the stage input data word associated with that stage that the stage output data word associated with that stage is the result of shuffling the shuffle subgroups of the stage input data word associated with that stage; and iii) in each stage excluded by the combination of stages called for by the rearrangement input signal, generating that stage's stage output data word by forwarding as each data unit $D_n$ in that stage output word the corresponding data unit $D_n$ in the stage input word associated with that stage.

36. A functional unit for performing a rearrangement operation by generating an array output signal representing an array output data word in response to a rearrangement input signal and an array input signal representing an array input data word, the functional unit comprising:

A) means for interpreting at least a plurality of the rearrangement input signal's possible values as calling for shuffle/unshuffle operations employing different selected combinations of stages; and B) means for performing a rearrangement operation in a series of J stages $S_j$, where $0 \leq j \leq J-1$, with each of which is associated a respective stage input data word and a respective stage output data word, the stage input data word associated with stage $S_0$ being the array input data word, the stage input data word associated with each other stage $S_j$ being the stage output data word associated with stage $S_{j-1}$, the array output data word being the stage output data word associated with stage $S_{J-1}$, each data word comprising a respective ordered set of N data units $D_n$, where n=0, 1, 2, ..., N-1, at least one of the stages being a shuffle stage, at least one other stage being an unshuffle stage, wherein:

i) each stage is associated with a respective subgroup size;

ii) the data units of each stage input word associated with an unshuffle stage form unshuffle subgroups of s consecutive data units, where s is the subgroup size associated with that unshuffle stage, and the corresponding data units of the stage output word associated with that stage form corresponding unshuffle subgroups; and iii) when the rearrangement input signal calls for a shuffle/unshuffle operation employing a selected combination of stages, the rearrangement operation includes:

a) in each unshuffle stage in the combination of stages called for by the rearrangement input signal, generating the stage output data word associated therewith by forwarding as that stage output word's data units the data units so selected from the stage input data word associated with that stage that the stage output data word associated with that stage is the result of unshuffling the unshuffle subgroups of the stage input data word associated with that stage;

b) in each shuffle stage in the combination of stages called for by the rearrangement input signal, generating the stage output data word associated therewith by forwarding as that stage output word's data units the data units so selected from the stage input data word associated with that stage that the stage output data word associated with that stage is the result of shuffling the shuffle subgroups of the stage input data word associated with that stage; and c) in each stage excluded by the combination of stages called for by the rearrangement input signal, generating that stage's stage output data word by forwarding as each data unit $D_n$ in that stage output word the corresponding data unit $D_n$ in the stage input word associated with that stage.

37. A method of performing a rearrangement operation by generating an array output signal representing an array output data word in response to a rearrangement input signal and an array input signal representing an array input data word, wherein:

A) the rearrangement operation is performed in a series of J stages $S_j$, where $0 \leq j \leq J-1$, with each of which is associated a respective stage input data word and a respective stage output data word, the stage input data word associated with stage $S_0$ being the array input data word, the stage input data word associated with each other stage $S_j$ being the stage output data word associated with stage $S_{j-1}$, the array output data word being the stage output data word associated with stage $S_{j-1}$, each data word comprising a respective ordered set of N data units $D_n$, where n=0, 1, 2, ..., N-1;

B) each stage is associated with a different respective subgroup size s selected from among the values $2^0, ..., 2^{J-1}$;

C) the data units of the stage input word associated with each stage are organized as a group set, as are the data units of the stage output word associated with that stage, each group set consisting of a different reversal group associated with each value of n<N such that n/2s is a non-negative integer, where s is the subgroup size with which that stage is associated, the reversal group associated with the value n consisting of the data units $D_k$ thereof such that n k n+2s-1 and being so divided into first and second reversal subgroups of s consecutive data units that the first reversal subgroup includes data unit $D_n$ and the second reversal subgroup includes data unit $D_{n+s}$;

D) the method includes interpreting at least a plurality of the rearrangement input signal's possible values as calling for reversal operations employing different selected combinations of the stages; and E) when the rearrangement signal's value is one thus interpreted as calling for a reversal operation employing a selected combination of the stages, the rearrangement operation includes:

i) in each stage included in the selected combination of stages, generating the stage output data word associated therewith by:

a) forwarding, as each data unit $D_n$ in each first reversal subgroup of that stage's stage output word, data unit $D_{n+s}$ in the stage input data word associated with that stage; and b) forwarding, as each data unit $D_n$ in each second reversal subgroup of that stage's stage output word, data unit $D_{n+s}$ in the stage input data word associated with that stage; and ii) in each stage excluded from the selected combination of stages, generating the stage output data word associated therewith by forwarding, as each data unit $D_n$ in that stage's stage output word, data unit $D_n$ in the stage input data word associated with that stage.

38. A functional unit for performing a rearrangement operation by generating an array output signal representing an array output data word in response to a rearrangement input signal and an array input signal representing an array input data word, the functional unit comprising:

A) means for interpreting at least a plurality of the rearrangement input signal's possible values as calling for reversal operations employing different selected combinations of the stages; and B) means for performing the rearrangement operation in a series of J stages $S_j$, where $0 \leq j \leq J-1$, with each of which is associated a respective stage input data word and a respective stage output data word, the stage input data word associated with stage $S_0$ being the array input data word, the stage input data word associated with each other stage $S_j$ being the stage output data word associated with stage $S_{j-1}$, the array output data word being the stage output data word associated with stage $S_{J-1}$, each data word comprising a respective ordered set of N data units $D_n$, where n=0, 1, 2, ..., N−1, wherein:

i) each stage is associated with a different respective subgroup size s selected from among the values $2^0, \ldots, 2^{J-1}$;

ii) the data units of the stage input word associated with each stage are organized as a group set, as are the data units of the stage output word associated with that stage, each group set consisting of a different reversal group associated with each value of n<N such that n/2s is a non-negative integer, where s is the subgroup size with which that stage is associated, the reversal group associated with the value n consisting of the data units $D_k$ thereof such that n k n+2s−1 and being so divided into first and second reversal subgroups of s consecutive data units that the first reversal subgroup includes data unit $D_n$ and the second reversal subgroup includes data unit $D_{n+s}$; and iii) when the rearrangement signal's value is one thus interpreted as calling for a reversal operation employing a selected combination of the stages, the rearrangement operation includes:

a) in each stage included in the selected combination of stages, generating the stage output data word associated therewith by:

(1) forwarding, as each data unit $D_n$ in each first reversal subgroup of that stage's stage output word, data unit $D_{n+s}$ in the stage input data word associated with that stage; and (2) forwarding, as each data unit $D_n$ in each second reversal subgroup of that stage's stage output word, data unit $D_{n-s}$ in the stage input data word associated with that stage; and b) in each stage excluded from the selected combination of stages, generating the stage output data word associated therewith by forwarding, as each data unit $D_n$ in that stage's stage output word, data unit $D_n$ in the stage input data word associated with that stage.

* * * * *